United States Patent [19]
Shimizu et al.

[11] Patent Number: 5,557,088
[45] Date of Patent: Sep. 17, 1996

[54] SELF-SCANNING POS SYSTEM, SELF-SCANNING REGISTRATION TERMINAL, CONTROL APPARATUS FOR SELF-SCANNING REGISTRATION TERMINAL AND POS APPARATUS FOR SELF-SCANNING REGISTRATION TERMINAL

[75] Inventors: Chizu Shimizu; Chizuo Suzuki; Kyoko Terada, all of Kawasaki, Japan

[73] Assignee: Fujitsu Limited, Kawasaki, Japan

[21] Appl. No.: 350,984

[22] Filed: Nov. 29, 1994

[30] Foreign Application Priority Data

Mar. 14, 1994 [JP] Japan .................. 6-042911

[51] Int. Cl.⁶ .................................................. G06K 7/00
[52] U.S. Cl. ................................................ 235/383
[58] Field of Search .................................... 255/383

[56] References Cited

U.S. PATENT DOCUMENTS

| | | | |
|---|---|---|---|
| 3,836,755 | 9/1975 | Ehrat | 235/462 |
| 4,071,740 | 1/1978 | Gogulski | 235/432 |
| 4,929,819 | 5/1990 | Collins, Jr. | 235/385 |
| 5,250,789 | 10/1993 | Johnsen | 235/383 |
| 5,294,781 | 3/1994 | Takahashi et al. | 235/383 |
| 5,345,071 | 9/1994 | Dumont | 235/383 |
| 5,361,871 | 11/1994 | Gupta et al. | 235/383 |
| 5,418,354 | 5/1995 | Halling et al. | 235/383 |
| 5,426,423 | 6/1995 | Raimbault et al. | 235/472 |

FOREIGN PATENT DOCUMENTS

| | | |
|---|---|---|
| 52-132651 | 11/1977 | Japan . |
| 58-96367 | 6/1983 | Japan . |
| 58-92058 | 6/1983 | Japan . |
| 63-36119 | 2/1988 | Japan . |
| 63-145591 | 6/1988 | Japan . |
| 63-223998 | 9/1988 | Japan . |
| 2-277412 | 11/1990 | Japan . |
| 3-232079 | 10/1991 | Japan . |
| 4-181463 | 6/1992 | Japan . |
| 4-293198 | 10/1992 | Japan . |
| 5-159162 | 6/1993 | Japan . |

Primary Examiner—John Shepperd
Attorney, Agent, or Firm—Armstrong, Westerman, Hattori, McLeland & Naughton

[57] ABSTRACT

A POS system which readily allows introduction of a self-scanning function. The POS system includes a POS apparatus including a settlement terminal for effecting final settlement of the accounts for a purchased commodity or commodities, and one or a plurality of self-scanning registration terminals accommodated in the POS apparatus by way of a control apparatus and each including a commodity code reader for reading a commodity code applied to a commodity. The control apparatus communicates commodity purchase information based on commodity code information read by the commodity code reader of the self-scanning registration terminal or any of the self-scanning registration terminals between the self-scanning registration terminal and the POS apparatus. The POS system can be applied in the distribution industry, particularly in a store such as a mass sales store, a convenience store or a supermarket.

37 Claims, 20 Drawing Sheets

FIG. 16

| LOOK UP KEY | CATEGORY | TYPE | COMMODITY NAME | ---- | OBJECT FOR DISCOUNT / PRICE REDUCTION |
|---|---|---|---|---|---|
| 49------ | 0533 | 0001 | TOFU | | * |
| 49------ | 0534 | 0001 | CHEESE | | * |

| FIXED PORTION | | | | PLU RESPONSE · ITEM | | | |
|---|---|---|---|---|---|---|---|
| | LOOK UP KEY | CATEGORY | UNIT PRICE | RECEIPT COMMODITY NAME | PLU DATE, TIME | DISCOUNT | · | MARK |
| | 49------- | 0534 | 188 | CHEESE | 93/08/30 15:00 | 150 | · | * |

FIG. 18

| ROW | COLUMN | DATA |
|---|---|---|
| 5 | 1 | 534 CHEESE ¥150* |
| 12 | 1 | * IS INDICATION AFTER DISCOUNT / PRICE REDUCTION |

FIG. 19

| CLASS | RECEIPT COMMODITY NAME | TYPE OF TAX | DISCOUNT / PRICE REDUCTION | TIME SERVICE |
|---|---|---|---|---|
| 0534 | CHEESE | EXCLUDED | NO | 93/8/30 ~ 93/9/1 |
| ¦ | ¦ | ¦ | ¦ | |

FIG. 20

```
        MAY 31, 1993    PM 2:30
   MEMBERSHIP No. xxxx  Mr. or Ms. OOOO
     533    TOFU ( 3 X ⓐ 74 )      ¥ 222
     534    CHEESE                 ¥ 150*
     534    CHEESE                 ¥ 150*
     ─────────────────────────────────────
     TOTAL                         ¥ 522

* IS INDICATION AFTER DISCOUNT/PRICE
     REDUCTION
```

SELF-SCANNING POS SYSTEM, SELF-SCANNING REGISTRATION TERMINAL, CONTROL APPARATUS FOR SELF-SCANNING REGISTRATION TERMINAL AND POS APPARATUS FOR SELF-SCANNING REGISTRATION TERMINAL

BACKGROUND OF THE INVENTION

1) Field of the Invention

This invention relates to a self-scanning POS system for use in the distribution industry, particularly in a store such as a mass sales store, a convenience store or a supermarket wherein, using a shopping cart (hand cart), or a shopping basket for accommodating and transporting purchased commodities, a customer can purchase a commodity while the customer itself reads a commodity code such as a bar code applied to the commodity and also to a self-scanning registration terminal, a control apparatus for a self-scanning registration terminal and a POS apparatus for a self-scanning registration terminal for use with the self-scanning POS system.

2) Description of the Related Art

Generally, a POS system is employed in various stores such as supermarkets and convenience stores. In the POS system, a customer walks around in a store pushing a shopping cart or carrying a shopping basket, places commodities to be purchased into the shopping cart or the shopping basket, and comes to a settlement POS terminal (POS register).

Then at the settlement POS terminal, an operator takes out the commodities one by one from the shopping cart or the shopping basket and reads the bar codes (commodity codes) applied to the commodities by means of a scanner to effect registration processing. In particular, in accordance with commodity code information read from each bar code, the price of the commodity corresponding to the commodity code is retrieved from a commodity information file (a Price Look Up, or PLU file), and a total amount of money of the purchased commodities is calculated to settle the accounts.

With such a POS system, however, since an operator must perform a reading operation of a commodity code of each commodity, much time is required for such reading operation and a settling operation, which causes the customer to wait for a long time. Accordingly, in a time band in which customers are crowded, a queue of customers is produced in front of a settlement POS terminal, and besides, the burden on the operator is heavy.

Thus, in recent years, a shopping cart (scanning cart) or a shopping basket having a scanner (commodity code reading section) for reading a bar code (commodity code) applied to a commodity has been developed and is disclosed in various publications including, for example, Japanese Patent Laid-Open Application No. Showa 63-145591.

In a POS system which employs a shopping cart or a shopping basket of the type mentioned, a customer itself reads a bar code applied to a commodity to be purchased by means of the scanner to register the commodity code information and places or accommodates the commodity into an accommodating section of the shopping cart or the shopping basket, and then after selection of commodities to be purchased is completed, the commodities are placed into the shopping cart or the shopping basket and transported to a settlement POS terminal.

Then at the settlement POS terminal, the commodity code information (or commodity price information corresponding to the commodity code information) registered by the customer itself is loaded down, and a total amount of money of the purchased commodities is calculated based on the commodity code information (commodity price information) to effect settlement of the accounts.

With the POS system, an operator need no more read the commodity codes of commodities one-by-one, and the time (register operation time) required for reading processing and settling processing can be reduced significantly. Consequently, the customer need not wait for a long time and also the burden on the operator can be reduced remarkably.

On the other hand, in order to provide better services to customers, various conditions or terms are often provided such as a time service condition wherein a discount in price is given when a particular commodity is purchased within a predetermined period, a bundle condition wherein a discount in price is given when a particular commodity is purchased at a predetermined number or quantity, a mix-match condition wherein a discount in price is given when a plurality of kinds of particular commodities are purchased in combination and a pair match condition wherein a discount in price is given when all of a plurality of different kinds of particular commodities are purchased. A POS system is required to cope with any of such discount conditions for such particular commodity or commodities.

With a self-scanning POS system of the type just mentioned, there is a problem to be solved in that a settlement POS terminal having a function of loading down commodity code information from a shopping cart is required. Besides, a host apparatus requires drastic modifications in both of the phases of the software and the hardware, and it is impossible to introduce existing software and hardware to construct a system readily. Thus, there is another problem to be solved in that a very high cost is required to realize an intended system.

Further, when any of discount conditions for a particular commodity or commodities such as a time service condition, a bundle condition, a mix-match condition and a pair match condition is satisfied, an amount of money after discounted or price reduction may be displayed. However, where an amount of money is merely displayed, the customer cannot determine whether or not the price of the commodity or commodities is actually discounted or reduced and may, having some doubts, inquire a shop person about the matter, resulting in degradation of the service, which is a further problem to be solved with the self-scanning POS system.

SUMMARY OF THE INVENTION

It is an object of the present invention to provide a self-scanning POS system, a self-scanning registration terminal, a control apparatus for a self-scanning registration terminal and a POS apparatus for a self-scanning registration terminal by which a self-scanning function can be introduced readily into an existing POS system to reduce the cost required to construct a system.

It is another object of the present invention to provide a self-scanning POS system, a self-scanning registration terminal, a control apparatus for a self-scanning registration terminal and a POS apparatus for a self-scanning registration terminal by which, when a discount condition is satisfied, a display from which a discount or reduction in price can be visually determined is provided together with a display of a normal price to provide a better service to a customer.

In order to attain the objects described above, according to an aspect of the present invention, there is provided a self-scanning POS system, which comprises a POS apparatus including a settlement terminal for effecting final settlement of the accounts for a purchased commodity or commodities, one or a plurality of self-scanning registration terminals accommodated in the POS apparatus and each including commodity code reading means for reading a commodity code applied to a commodity, and a control apparatus interposed between the POS apparatus and the self-scanning registration terminal or terminals for communicating commodity purchase information based on commodity code information read by the commodity code reading means of the self-scanning registration terminal or any of the self-scanning registration terminals between the self-scanning registration terminal and the POS apparatus.

According to another aspect of the present invention, there is provided a self-scanning registration terminal, which comprises commodity code reading means for reading a commodity code applied to a commodity, and the self-scanning registration terminal being accommodated by way of a control apparatus in a POS apparatus which includes a settlement terminal for effecting final settlement of the accounts for a purchased commodity or commodities, the self-scanning registration terminal communicating commodity purchase information based on commodity code information read by the commodity code reading means with the POS apparatus by way of the control apparatus.

According to a further aspect of the present invention, there is provided a control apparatus for a self-scanning registration terminal interposed between a POS apparatus including a settlement terminal for effecting final settlement of the accounts for a purchased commodity or commodities and one or a plurality of self-scanning registration terminals each including commodity code reading means for reading a commodity code applied to a commodity such that the self-scanning registration terminal or terminals are accommodated in the POS apparatus by way of the control apparatus, the control apparatus communicating commodity purchase information based on commodity code information read by the commodity code reading means of the self-scanning registration terminal or any of the self-scanning registration terminals between the self-scanning registration terminal and the POS apparatus.

According to a still further aspect of the present invention, there is provided a POS apparatus for a self-scanning registration terminal, which comprises a settlement terminal for effecting final settlement of the accounts for a purchased commodity or commodities, the POS apparatus accommodating by way of a control apparatus one or a plurality of self-scanning registration terminals each including commodity code reading means for reading a commodity code applied to a commodity, the POS apparatus communicating commodity purchase information based on commodity code information read by the commodity code reading means with the self-scanning registration terminal by way of the control apparatus.

According to a yet further aspect of the present invention, there is provided a self-scanning POS system, which comprises a self-scanning registration terminal including commodity code reading means for reading a commodity code applied to a commodity, and a control apparatus for controlling the self-scanning registration terminal, the self-scanning registration terminal including commodity code information notification means for notifying, when a commodity code is read by the commodity code reading means, the commodity code information to the control apparatus, and display means for displaying thereon commodity information regarding the commodity whose commodity code has been read by the commodity code reading means, the control apparatus including a commodity information file for storing commodity information of commodities corresponding to commodity codes, and commodity information retrieval means for retrieving from the commodity information file commodity information corresponding to commodity code information notified from the self-scanning registration terminal by the commodity code information notification means, the commodity information file having stored in advance therein display contents to be displayed on the display means of the self-scanning registration terminal when a predetermined discount sales condition is satisfied as commodity information of a commodity corresponding to a commodity code.

According to a yet further aspect of the present invention, there is provided a control apparatus for a self-scanning registration terminal for controlling a self-scanning registration terminal which includes commodity code reading means for reading a commodity code applied to a commodity and display means for displaying commodity information regarding a commodity whose commodity code has been read by the commodity code reading means, comprising a commodity information file for storing commodity information of commodities corresponding to commodity codes, and commodity information retrieval means for retrieving commodity information corresponding to commodity code information notified from the self-scanning registration terminal from the commodity information file, the commodity information file having stored in advance therein display contents to be displayed on the display means of the self-scanning registration terminal when a predetermined discount sales condition is satisfied as commodity information of a commodity corresponding to a commodity code.

Accordingly, with the self-scanning POS system of the present invention, only by additionally providing a control apparatus, a plurality of self-scanning registration terminals can be accommodated into a POS apparatus having a substantially same construction to that of an existing POS apparatus. Consequently, a system having a self-scanning function can be built up very readily at a minimum cost.

Further, with the self-scanning POS system of the present invention, when a customer effects a reading operation of a commodity code of a commodity and the commodity satisfies a discount sales condition, this is displayed on the display means of the self-scanning registration terminal. Consequently, visually confirming the display on the display means, the customer can discriminate the commodity of an object for discount/price reduction and will not have a doubt over or inquire a shop person about an indication of a price. Accordingly, there is another advantage in that better services can be provided to customers.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 16 is a table illustrating information stored in a PLU file employed in the self-scanning POS system shown in FIG. 15;

FIG. 17 is a table illustrating a PLU descending message produced by a PLU processing section of the self-scanning POS system shown in FIG. 15;

FIG. 18 is a table illustrating exemplary display data produced by a display control section of the self-scanning POS system shown in FIG. 15;

FIG. 19 is a table illustrating contents of data of a preset file used in the self-scanning POS system shown in FIG. 15;

FIG. 20 is a schematic illustration showing a form of a display provided by a display unit employed in the self-scanning POS system shown in FIG. 15;

DESCRIPTION OF THE PREFERRED EMBODIMENTS

The present invention will now be described with reference to the drawings.

Figure 1:
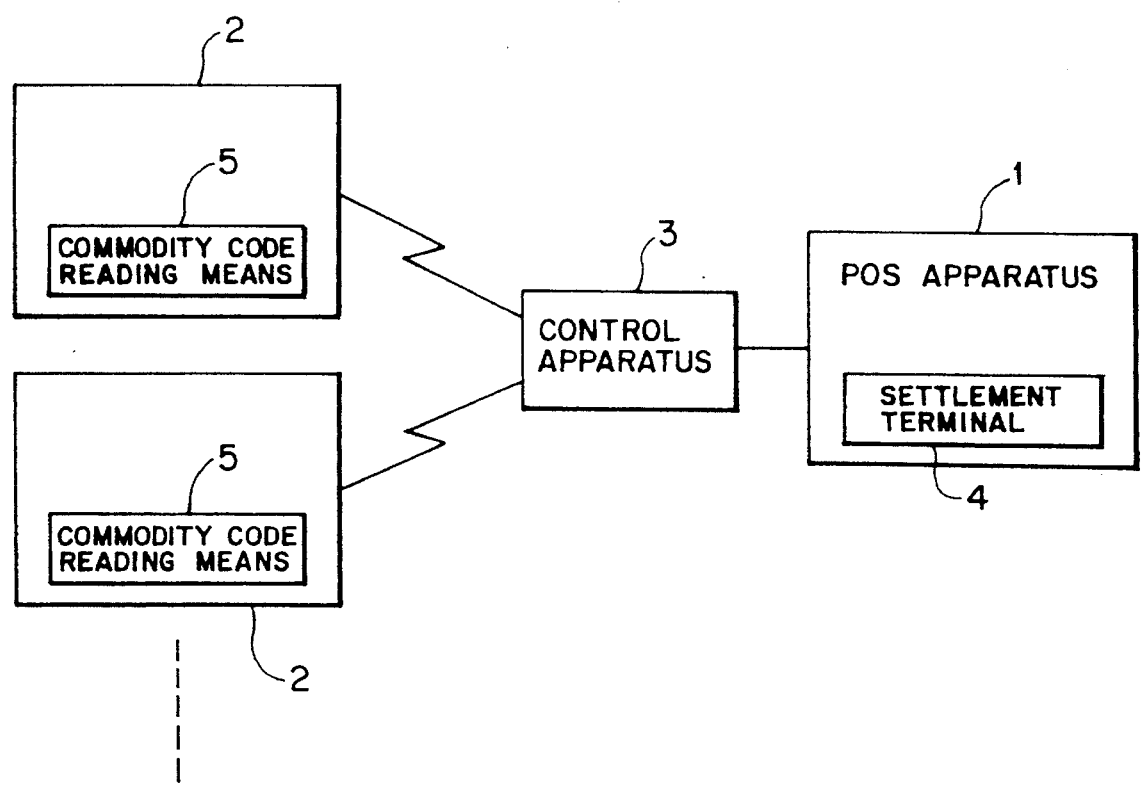
FIGS. 1 and 2 are block diagrams illustrating different aspects of the present invention.

FIG. 1 illustrates a self-scanning POS system according to an aspect of the present invention. Referring to FIG. 1, the self-scanning POS system includes a POS apparatus 1 which in turn includes a settlement terminal 4 for effecting final settlement of the accounts for a purchased commodity or commodities based on commodity code information applied to the commodity or commodities.

The self-scanning POS system further includes a plurality of self-scanning registration terminals 2 accommodated in the POS apparatus 1 by way of a control apparatus 3 and each including commodity code reading means 5 for reading a commodity code applied to a commodity.

The control apparatus 3 communicates commodity purchase information based on commodity code information read by the commodity code reading means 5 of a self-scanning registration terminal 2 located between the self-scanning registration terminal 2 and the POS apparatus 1.

Each of the self-scanning registration terminals 2 may include commodity code information notification means for notifying, when a commodity code is read by the commodity code reading means 5, the commodity code information to the control apparatus 3. In this instance, the control apparatus 3 may include commodity information retrieval means for retrieving commodity information of a commodity corresponding to commodity code information notified from a self-scanning registration terminal 2 by the commodity code information notification means, and commodity information notification means for notifying the commodity information retrieved by the commodity information retrieval means to the self-scanning registration terminal 2.

Each of the self-scanning registration terminals 2 may further include execution sales price determination means for calculating and determining a sales price of a commodity whose commodity code has been read by the commodity code reading means 5 based on commodity information notified from the control apparatus 3 by the commodity information notification means, and may further include storage means for storing detailed transaction information obtained based on commodity information notified from the control apparatus 3 by the commodity information notification means and a sales price determined by the execution sales price determination means.

Each of the self-scanning registration terminals 2 may further include display means for displaying thereon commodity information including commodity information notified from the control apparatus 3 by the commodity information notification means and a sales price determined by the execution sales price determination means.

Further, each of the self-scanning registration terminals 2 may further include an end key adapted to be operated upon ending of purchasing of a commodity or commodities, and first terminal identification information notification means for notifying terminal identification information unique to the self-scanning registration terminal 2 to the control apparatus 3 when the end key is operated. In this instance, the control apparatus 3 may include registration terminal control means for holding terminal identification information notified from any of the self-scanning registration terminals 2 by the first terminal identification information notification means to control an operation condition of the self-scanning registration terminal 2.

Or, each of the self-scanning registration terminals 2 may further include an end key adapted to be operated upon ending of purchasing of a commodity or commodities, and first terminal identification information notification means for notifying terminal identification information unique to the self-scanning registration terminal 2 to the control apparatus 3 when the end key is operated. In this instance, the POS apparatus 1 may include second terminal identification information notification means for notifying, when terminal identification information of the self-scanning registration terminal 2 or any of the self-scanning registration terminals 2 is inputted from the settlement terminal 4, the terminal identification information to the control apparatus 3 while the control apparatus 3 includes registration terminal control means for holding terminal identification information notified from any of the self-scanning registration terminals 2 by the first terminal identification information notification means to control an operation condition of the self-scanning registration terminal 2, determination means for determining whether or not the terminal identification information notified from the POS apparatus 1 by the second terminal identification information notification means is held by the registration terminal control means, and detailed transaction information requesting means for requesting, when it is determined by the determination means that the terminal identification information is held by the registration terminal control means, the self-scanning registration terminal 2 corresponding to the terminal identification information to notify the detailed transaction information stored in the storage means.

Further, each of the self-scanning registration terminals 2 may further include detailed transaction information notification means for notifying, when notification of the detailed transaction information is requested from the control apparatus 3 by the detailed transaction information requesting means, the detailed transaction information stored in the storage means to the settlement terminal 4 of the POS apparatus 1 by way of the control apparatus 3.

Alternatively, the POS apparatus 1 may include terminal identification information notification means for notifying, when terminal identification information of any of the self-scanning registration terminals 2 is inputted from the settlement terminal 4, the terminal identification information to the self-scanning registration terminal 2 corresponding to the terminal identification information by way of the control apparatus 3. In this instance, each of the self-scanning registration terminals 2 may further include an end key adapted to be operated upon ending of purchasing of a commodity or commodities, condition control means for controlling and holding, when the end key is operated, that the self-scanning registration terminal 2 is in an end condition, determination means for referring to the condition control means to determine whether or not the self-scanning registration terminal 2 is in an end condition at the point of time when terminal identification information is notified from the POS apparatus 1 by the terminal identification information notification means, and detailed transaction information notification means for notifying, when it is determined by the determination means that the self-scanning registration terminal 2 is in an end condition, the detailed transaction information stored in the storage means to the settlement terminal 4 of the POS apparatus 1 by way of the control apparatus 3.

Or, the settlement terminal 4 may include inputting means for inputting commodity information to register the commodity information into or modify the detailed transaction information after the detailed transaction information is notified from the self-scanning registration terminal 2 by the detailed transaction information notification means.

Each of the self-scanning registration terminals 2 may include customer identification information inputting means for inputting customer identification information unique to a customer who uses any of the self-scanning registration terminals 2. In this instance, the POS apparatus 1 may include inquiring means for determining, when customer identification information inputted from the customer identification information inputting means is received by way of the control apparatus 3, based on the customer identification information whether use of the self-scanning registration terminal 2 is to be permitted or rejected.

In this instance, each of the self-scanning registration terminals 2 may include control means for disabling use of the self-scanning registration terminal 2 when information received from the inquiring means of the POS apparatus 1 by way of the control apparatus 3 represents that use of the self-scanning registration terminal 2 is to be rejected but enabling use of the self-scanning registration terminal 2 when the information represents that use of the self-scanning registration terminal 2 is to be permitted. Further, each of the self-scanning registration terminals 2 may further include use rejection notification means for notifying, when information received from the inquiring means of the POS apparatus 1 by way of the control apparatus 3 represents that use of the self-scanning registration terminal 2 is to be rejected, such rejection to the customer.

The commodity code reading means 5 may serve also as the customer identification information inputting means. Further, the customer identification information inputting means may be constructed as a bar code reader which reads and inputs a membership number in the form of a bar code of a membership card possessed by a customer as the customer identification information or as a magnetic code reader which reads and inputs a membership number in the form of a magnetic code of a membership card possessed by a customer as the customer identification information.

The POS apparatus 1 may further include a customer data base for storing commodity purchase information of individual customers for individual customer identification information, and registration means for registering, when a customer uses any of the self-scanning registration terminals 2, commodity purchase information transmitted thereto from the self-scanning registration terminal 2 by way of the control apparatus 3 into the customer data base in accordance with the customer identification information unique to the customer.

In the scanning POS system of the present invention described above with reference to FIG. 1, a commodity code applied to a commodity is read by means of the commodity code reading means 5 by an operation of a customer who uses any of the self-scanning registration terminals 2. The settlement terminal 4 of the POS apparatus 1 effects final settlement of the accounts for a purchased commodity or commodities based on commodity code information applied to the commodity or commodities.

Since the control apparatus 3 communicates commodity purchase information based on the commodity code information read by the commodity code reading means 5 of the self-scanning registration terminal 2 between the self-scanning registration terminal 2 and the POS apparatus 1, a self-scanning function can be introduced into the existing POS apparatus 1 only by additionally providing the control apparatus 3 to the POS apparatus 1.

It is to be noted that, when a commodity code is read by the commodity code reading means 5 of any of the self-scanning registration terminals 2, the commodity code information notification means notifies the commodity code information to the control apparatus 3. The commodity information retrieval means of the control apparatus 3 thus retrieves commodity information of the commodity corresponding to the commodity code information notified from the self-scanning registration terminal 2 by the commodity code information notification means. The commodity information thus retrieved is notified to the self-scanning registration terminal 2 by the commodity information notification means. Thus, the commodity information is communicated between the self-scanning registration terminal 2 and the POS apparatus 1.

Further, the execution sales price determination means of the self-scanning registration terminal 2 calculates and determines a sales price of the commodity whose commodity code has been read by the commodity code reading means 5 based on the commodity information notified from the control apparatus 3, and the storage means stores detailed transaction information obtained based on the commodity information notified from the control apparatus 3 and the sales price determined by the execution sales price determination means.

Further, the display means of the self-scanning registration terminal 2 displays thereon commodity information including the commodity information notified from the control apparatus 3 and the sales price determined by the execution sales price determination means.

Furthermore, upon ending of purchasing of a commodity or commodities, the end key of the self-scanning registration terminal 2 will be operated. In response to the operation of the end key, the first terminal identification information notification means of the self-scanning registration terminal 2 notifies terminal identification information unique to the self scanning registration terminal 2 to the control apparatus 3. Consequently, the registration terminal control means of the control apparatus 3 holds the terminal identification information notified from the self-scanning registration terminal 2 to control an operation condition of the self-scanning registration terminal 2.

Meanwhile, the second terminal identification information notification means of the POS apparatus 1 notifies, when the terminal identification information of the self-scanning registration terminal 2 is inputted from the settlement terminal 4, the terminal identification information to the control apparatus 3. The registration terminal control means of the control apparatus 3 holds the terminal identification information notified from the self-scanning registration terminal 2 by the first terminal identification information notification means to control an operation condition of the self-scanning registration terminal 2. Then, the determination means of the control apparatus 3 determines whether or not the terminal identification information notified from the POS apparatus 1 is held by the registration terminal control means. When it is determined by the determination means that the terminal identification information is held by the registration terminal control means, the detailed transaction information requesting means requests the self-scanning registration terminal 2 corresponding to the terminal identification information to notify the detailed transaction information stored in the storage means.

When notification of the detailed transaction information is requested from the control apparatus 3, the detailed transaction information notification means notifies the detailed transaction information stored in the storage means to the settlement terminal 4 of the POS apparatus 1 by way of the control apparatus 3.

Further, when the terminal identification information is notified from the POS apparatus 1 by the terminal identification information notification means, the determination means refers to the condition control means to determine whether or not the self-scanning registration terminal 2 is in an end condition, and when it is determined by the determination means that the self-scanning registration terminal 2 is in an end condition, the detailed transaction information notification means notifies the detailed transaction information stored in the storage means to the settlement terminal 4 of the POS apparatus 1 by way of the control apparatus 3.

After the detailed transaction information is notified from the self-scanning registration terminal 2, commodity information is inputted by way of the inputting means of the settlement terminal 4 to register the commodity information into or modify the detailed transaction information.

When the customer identification information unique to the customer who uses the self-scanning registration terminal 2 is inputted from the customer identification information inputting means of the self-scanning registration terminal 2, the inquiring means of the POS apparatus 1 determines, based on the customer identification information, whether use of the self-scanning registration terminal 2 is to be permitted or rejected.

In this instance, when the information received from the POS apparatus 1 by way of the control apparatus 3 represents that use of the self-scanning registration terminal 2 is to be rejected, the control means of the self-scanning registration terminal 2 disables use of the self-scanning registration terminal 2 and the use rejection notification means notifies such rejection to the customer. On the contrary, when the information represents that use of the self-scanning registration terminal 2 is to be permitted, the control means enables use of the self-scanning registration terminal 2.

Where the commodity code reading means 5 serves also as the customer identification information inputting means, there is no need for providing the customer identification information inputting means separately or additionally. In this instance, the customer identification information inputting means may be constructed as a bar code reader which reads and inputs a membership number in the form of a bar code of a membership card possessed by a customer as the customer identification information or as a magnetic code reader which reads and inputs a membership number in the form of a magnetic code of a membership card possessed by a customer as the customer identification information.

Where the customer data base for storing commodity purchase information of individual customers for individual customer identification information is employed in the POS apparatus 1, the registration means registers, when the customer uses the self-scanning registration terminal 2, the commodity purchase information transmitted thereto from the self-scanning registration terminal 2 by way of the control apparatus 3 into the customer data base in accordance with the customer identification information unique to the customer.

In this manner, with the self-scanning POS system of the present invention shown in FIG. 1, only by additionally providing the control apparatus 3, a plurality of self-scanning registration terminals 2 can be accommodated into a POS apparatus having the substantially same construction as that of an existing POS apparatus. Consequently, a system having a self-scanning function can be built up very readily at a minimum cost.

Since, upon ending of purchasing of a commodity or commodities, the detailed transaction information stored in the storage means of any of the self-scanning registration terminals 2 is transmitted from the self-scanning registration terminal 2 by way of the control apparatus 3 to the settlement terminal 4 so that settlement operation can be performed at the settlement terminal 4, only by additionally introducing into the existing POS apparatus 1 means for communicating with the control apparatus 3, the time which has conventionally been required for settlement processing at the settlement terminal 4 can be reduced remarkably to reduce the waiting time at the settlement place. Accordingly, the customer will not have a disagreeable feeling and the operation of the operator can be reduced. Thus, the shopping time of shopping in the form of self shopping can be reduced and the convenience can be enhanced.

Further, since any of the self-scanning registration terminals 2 which has been put into a purchase end condition as a result of an operation of the end key is controlled by the registration terminal control means of the control apparatus 3, when detailed transaction information is requested, upon final settlement of the accounts at the settlement terminal 4, to a self-scanning registration terminal 2, which is in resting condition or is still operating, as a result of an error in operation of the operator, detailed transaction information of a different self-scanning registration terminal 2 is prevented from being delivered to the settlement terminal. Consequently, the reliability in final settlement of the accounts of the settlement terminal 4 can be assured.

Further, since, upon final settlement of the accounts at the settlement terminal 4, commodity information can be inputted to register it into or modify detailed transaction information notified from a self-scanning registration terminal 2, registration of a commodity which has failed to be read or registered by the commodity code reading means 5 or modification for a commodity whose sale prices is to be changed urgently can be performed.

Further, by reading, upon starting of use of a self-scanning registration terminal 2, a membership number by means of the commodity code reading means 5 and making inquiries about the membership number by means of the inquiring means of the host apparatus, it can be determined whether or not the user of the self-scanning registration terminal 2 is a proper member. When the membership number coincides with data for negative checking, it is determined that use of the self-scanning registration terminal 2 is to be rejected, and such determination of rejection is notified to the user of the self-scanning registration terminal 2. Besides, use of the self-scanning registration terminal 2 can be disabled by the control means of the self-scanning registration terminal 2. Accordingly, unjust use of the membership card can be prevented with certainty.

Further, since the commodity code reading means 5 serves also as the customer identification information inputting means, there is no need for providing the customer identification information inputting means additionally or separately. Consequently, a system for identification of a customer can be introduced at a low cost without modifying the hardware on the self-scanning terminal 2 side.

Furthermore, by registering commodity purchase information from each self-scanning registration terminal 2 for each customer into the customer data base of the host apparatus, the shopping time, the sales condition and so forth are controlled for each customer, and by analyzing them, further improvement in service to each customer can be achieved.

Figure 2:
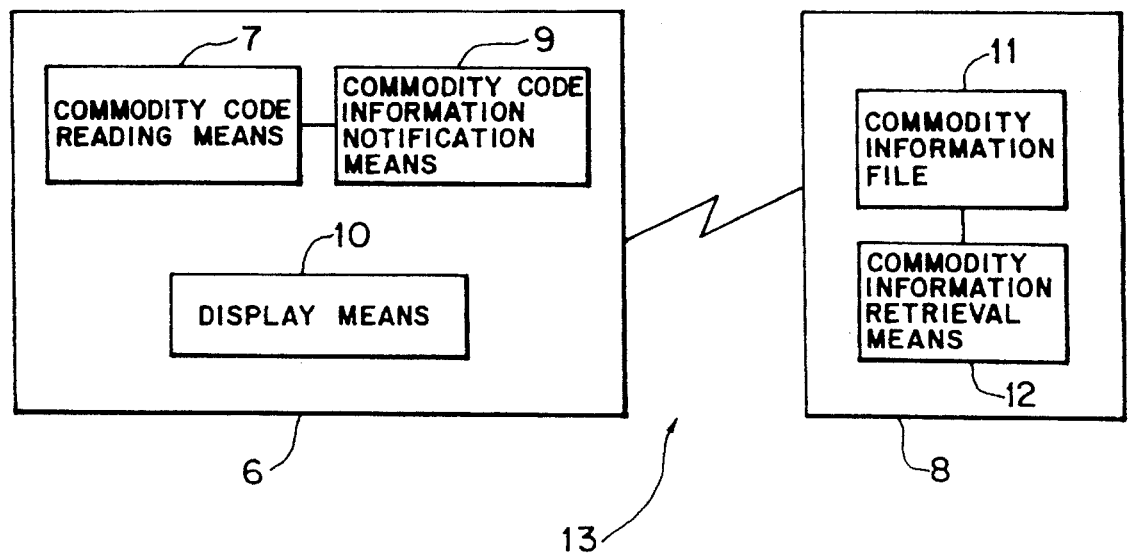

Referring now to FIG. 2, there is shown a self-scanning POS system according to another aspect of the present invention. The self-scanning POS system is generally denoted at 13 and includes a self-scanning registration terminal 6 and a control apparatus 8.

The self-scanning registration terminal 6 includes commodity code reading means 7, commodity code information notification means 9, and display means 10.

The commodity code reading means 7 reads a commodity code applied to a commodity. The commodity code information notification means 9 notifies commodity code information from the commodity code reading means 7 to the control apparatus 8. The display means 10 displays thereon commodity information regarding a commodity whose commodity code has been read by the commodity code reading means 7.

The control apparatus 8 controls the self-scanning registration terminal 6 and includes a commodity information file 11 and commodity information retrieval means 12.

The commodity information file 11 stores commodity information of commodities corresponding to commodity codes. In the present invention, as such commodity information of commodities corresponding to commodity codes, display contents to be displayed on the display means 10 of the self-scanning registration terminal 6 when a predetermined discount sales condition is satisfied are stored in advance in the commodity information file 11.

The commodity information retrieval means 12 retrieves from the commodity information file 11 commodity information corresponding to commodity code information notified from the self-scanning registration terminal 6 by the commodity code information notification means 9.

The predetermined discount sales condition mentioned above may be a time service condition for effecting a price discount when a particular commodity is purchased within a predetermined period, a bundle condition for effecting a price discount when a particular commodity is purchased by a predetermined number, a mix-match condition for effecting a price discount when a plurality of kinds of particular commodities are purchased in combination or a pair match condition for effecting a price discount when a plurality of kinds of particular commodities are purchased for all of the kinds.

Alternatively, the control apparatus 8 may further include commodity code information notification means for notifying commodity information retrieved by the commodity information retrieval means 12 to the self-scanning registration terminal 6. In this instance, the self-scanning registration terminal 6 may further include a preset file in which various sales conditions including the predetermined discount sales condition are stored in advance for individual commodities, discount sale condition determination means for reading out, in accordance with commodity information notified from the control apparatus 8 by the commodity code information notification means, the predetermined discount sales condition of the commodity stored in the preset file and determining whether or not the predetermined discount sales condition is satisfied, execution sales price determination means for reading out, in accordance with the commodity information notified from the control apparatus 8 by the commodity code information notification means, the sales conditions of the commodity stored in the preset file and calculating and determining a sales price of the commodity whose commodity code has been read by the commodity code reading means 7 based on the thus read out sales conditions and the commodity information notified from the control apparatus 8 by the commodity code information notification means, and display control means for editing and producing, when it is determined by the discount sales condition determination means that the predetermined discount sales condition is satisfied, display data for the display means 10 based on the display contents notified as the commodity information from the control apparatus 8 by the commodity code information notification means, the other commodity information and the sales price determined by the execution sales price determination means and controlling the display means 10 to display the display data thereon.

Otherwise, the control apparatus 8 may further include a preset file in which various sales conditions including the predetermined discount sales condition are stored in advance for individual commodities, discount sales condition determination means for reading out, based on commodity information retrieved by the commodity information retrieval means 12, the predetermined discount sales condition of the commodity stored in the preset file and determining whether or not the predetermined sales condition is satisfied, execution sales price determination means for reading out, in accordance with the commodity information retrieved by the commodity information retrieval means 12, the sales conditions of the commodity stored in the preset file and calculating and determining a sales price of the commodity whose commodity code has been read by the commodity code reading means 7 based on the thus read out sales conditions and the commodity information retrieved by the commodity information retrieval means 12, display data edition means for editing and producing, when it is determined by the discount sales condition determination means that the predetermined discount sales condition is satisfied, display data for the display means 10 of the self-scanning registration terminal 6 based on the display contents retrieved as the commodity information by the commodity information retrieval means 12, the other commodity information and the sales price determined by the execution sales price determination means, and display data notification means for notifying the display data edited and produced by the display data edition means to the self-scanning registration terminal 6. In this instance, the self-scanning registration terminal 6 may further include control means for controlling the display means 10 to display thereon the display data notified from the control apparatus 8 by the display data notification means.

In the self-scanning POS system of the present embodiment described above with reference to FIG. 2, display contents to be displayed on the display means 10 of the self-scanning registration terminal 6 when a predetermined discount sales condition such as a time service condition, a bundle condition, a mix-match condition or a pair match condition is satisfied as commodity information of a commodity corresponding to a commodity code are stored in advance in the commodity information file of the control apparatus 8. Then, the commodity information retrieval means 12 retrieves from the commodity information file 11 commodity information corresponding to commodity code information notified from the self-scanning registration terminal 6 by the commodity code information notification means 9. Consequently, when the discount sales condition is satisfied, information to be displayed on the display means 10 can be obtained by such retrieval.

Further in the self-scanning POS system of the present invention, the commodity information retrieved by the commodity information retrieval means 12 of the control apparatus 8 is notified to the self-scanning registration terminal 6 by the commodity code information notification means 9. In the self-scanning registration terminal 6, in accordance with the commodity information notified by the commodity code information notification means 9, the predetermined discount sales condition of the commodity stored in the preset file is read out, and the discount sales condition determination means determines whether or not the predetermined discount sales condition is satisfied.

Further, the execution sales price determination means determines a sales price of the commodity whose commodity code has been read by the commodity code reading means 7 based on the sales conditions of the commodity and the commodity information notified from the control apparatus 8 by the commodity code information notification means 9.

Then, when it is determined by the discount sales condition determination means that the predetermined discount sales condition is satisfied, display data are edited and produced by the display control means based on the display contents notified as the commodity information from the control apparatus 8 by the commodity code information notification means 9, the other commodity information and the sales price determined by the execution sales price determination means, and the display data are displayed on the display means 10.

Further, in the self-scanning POS system of the present invention, based on the commodity information retrieved by the commodity information retrieval means 12, the predetermined discount sales condition of the commodity stored in the preset file of the control apparatus 8 is read out, and it is determined by the discount sales condition determination means whether or not the predetermined sales condition is satisfied.

Further, the execution sales price determination means calculates and determines a sales price of the commodity whose commodity code has been read by the commodity code reading means 7 based on the sales conditions of the commodity and the commodity information retrieved by the commodity information retrieval means 12.

When it is determined by the discount sales condition determination means that the predetermined discount sales condition is satisfied, display data are edited and produced based on the display contents retrieved as the commodity information by the commodity information retrieval means 12, the other commodity information and the sales price determined by the execution sales price determination means.

The display data are notified to the self-scanning registration terminal 6 by the display data notification means. The display data edited and produced by the display data edition means are displayed in the display means 10 under the control of the display control means of the self-scanning registration terminal 6.

With the self-scanning POS system of the present invention shown in FIG. 2, since a reading operation of commodity code of a commodity is performed by a customer and, when the commodity satisfies a discount sales condition, this is displayed on the display means, the customer can discriminate a commodity for an object of discount/price reduction by visually confirming the displayed contents on the display means 10 of the self-scanning registration terminal 6. Consequently, the customer will not have a doubt or will not make inquiries to a shop person over an indication of a price, and better services can be provided to customers.

Further, with the self-scanning POS system of the present invention, the self-scanning registration terminal 6 is simplified in construction, and the self-scanning registration terminal 6, which is accommodated by a great number in the self-scanning POS system, can be made compact and less expensive. Consequently, a system can be built up at a very low cost.

Figure 3:
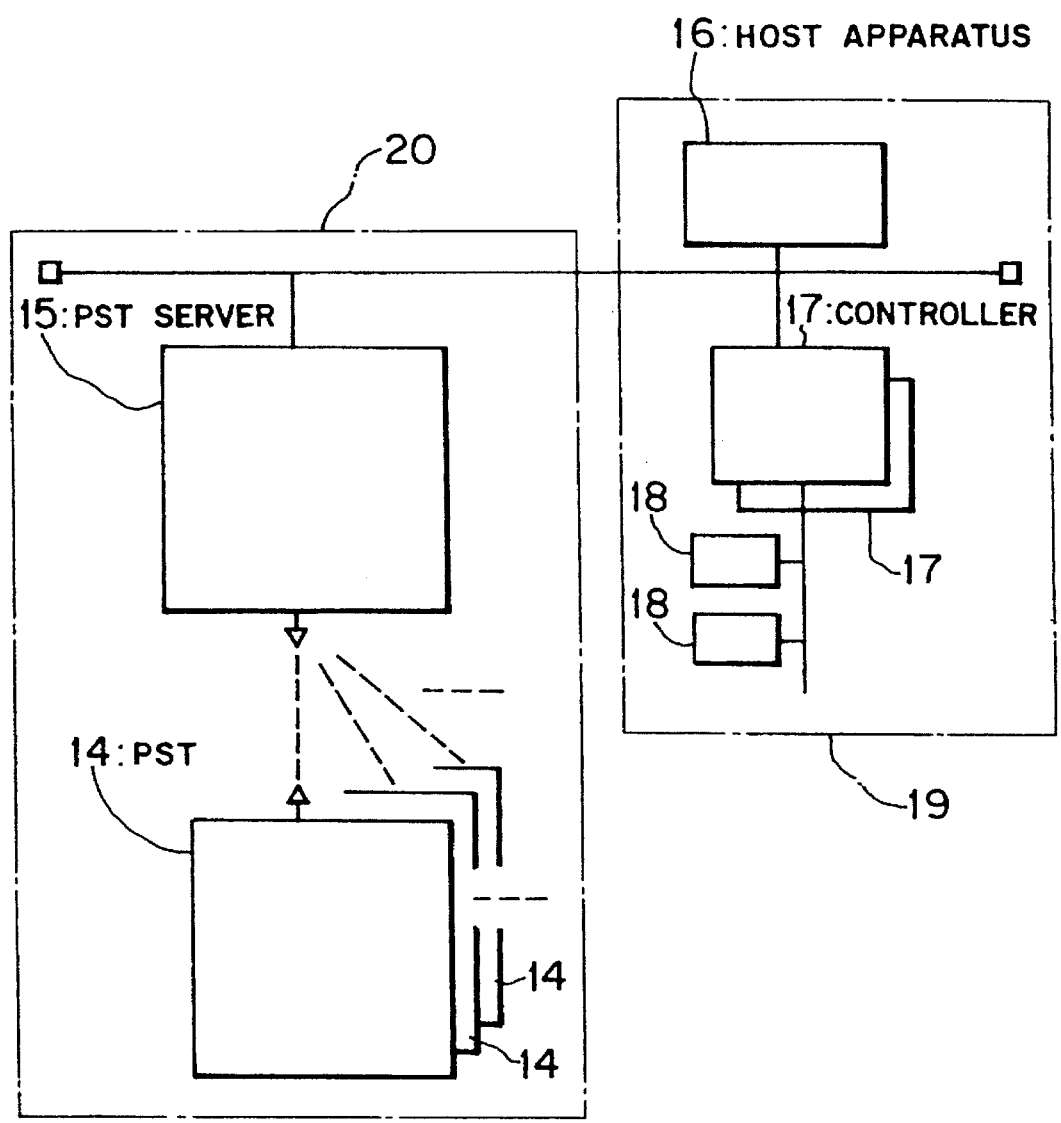
FIG. 3 is a block diagram showing an outline of a self-scanning POS system according to a first preferred embodiment of the present invention.

Referring now to FIG. 3, there is shown a self-scanning POS system according to a first preferred embodiment of the present invention. The self-scanning POS system shown includes a plurality of personal scanning terminals or self-scanning registration terminals (hereinafter referred to as PSTs) 14 provided in a store and adapted to be used upon shopping by customers.

Figure 6:
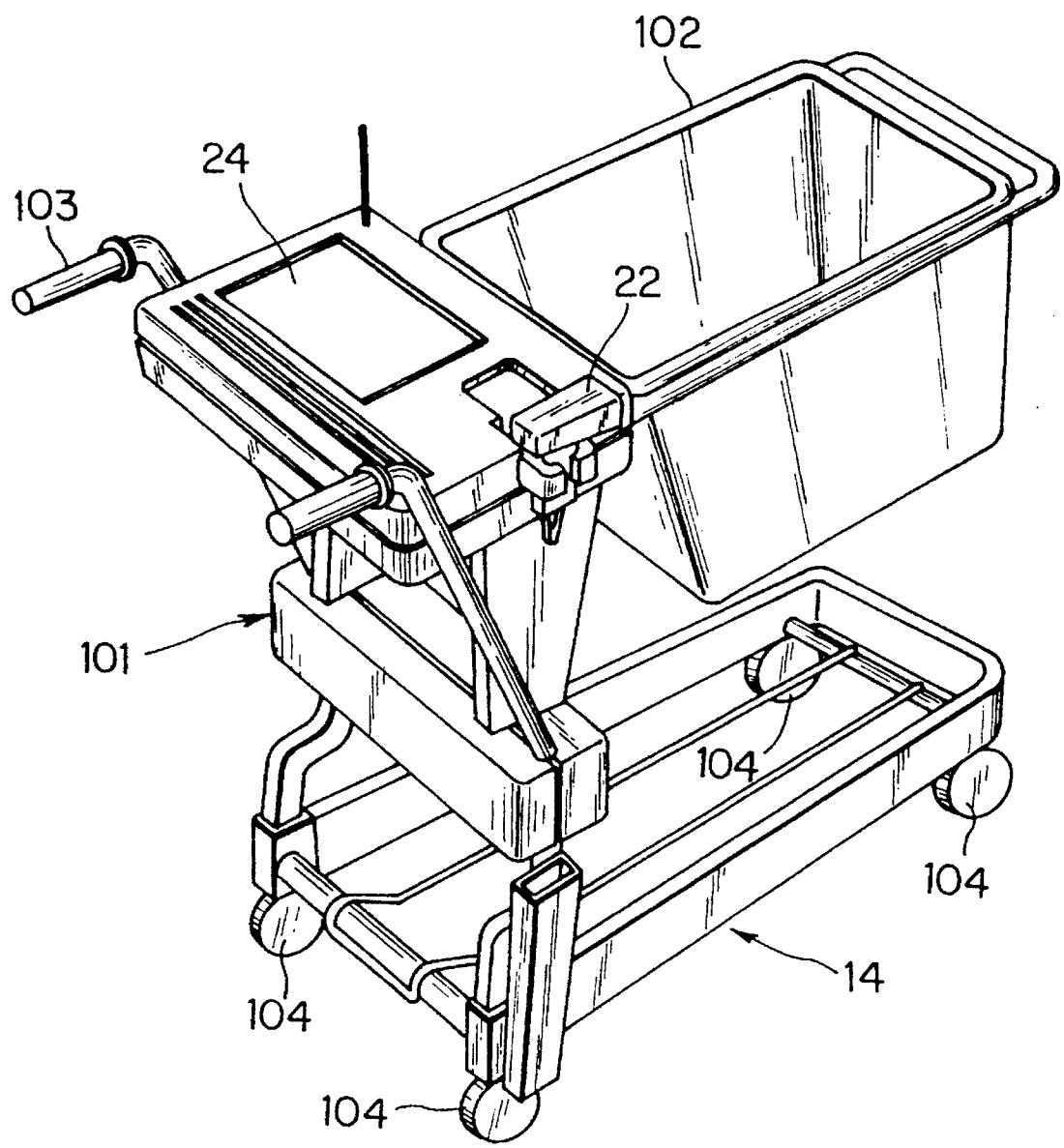
FIG. 6 is a perspective view showing a PST employed in the self-scanning POS system shown in FIG. 3.

Each of the PSTs 14 has, for example, a terminal number registered therein as terminal identification information unique thereto. Each of the PSTs 14 has, for example, such a construction as shown in FIG. 6. In particular, referring to FIG. 6, the PST 14 shown includes a cart section 101 and a basket member 102 which serves as an accommodation section.

The cart section 101 is constructed so as to receive the basket member 102 thereon and includes a pair of handle sections 103 for being grasped by a using person such as a customer, and four roller members 104 provided for rotation on the bottom of the cart section 101. The cart section 101 further includes, as hereinafter described in detail with reference also to FIGS. 4, 5 and 7, a reading section 22 for reading a commodity code (bar code) applied to a commodity to be purchased and a display section 24 for displaying various information thereon.

A customer can thus operate the PST 14 to read a commodity code applied to a commodity to be purchased, place the commodity into the basket member 102, and effect a final settlement of the accounts at a POS apparatus 19, which will be hereinafter described, to enjoy shopping.

Referring back to FIG. 3, the self-scanning POS system further includes a PST server (management apparatus) 15 interposed between the PSTs 14 and the POS apparatus 19 so as to accommodate the PSTs 14 into the POS system (POS apparatus) 19 for communicating information based on commodity code information read by a PST 14 between the PST 14 and the POS apparatus 19.

A personal scanning system (PSS) 20 is constituted from the PSTs 14 and the PST server 15.

The POS apparatus 19 is provided to effect final settlement of the accounts for commodities from which commodity codes have been read by operation of a PST 14 by a customer and includes a host apparatus 16, a plurality of controllers 17 and a plurality of settlement POS terminals 18.

A plurality of settlement POS terminals 18 are accommodated in and controlled by each of the controllers 17 and are each used to effect final settlement of the accounts for commodities to be purchased from which commodity codes have been read by a PST 14.

Figure 4:
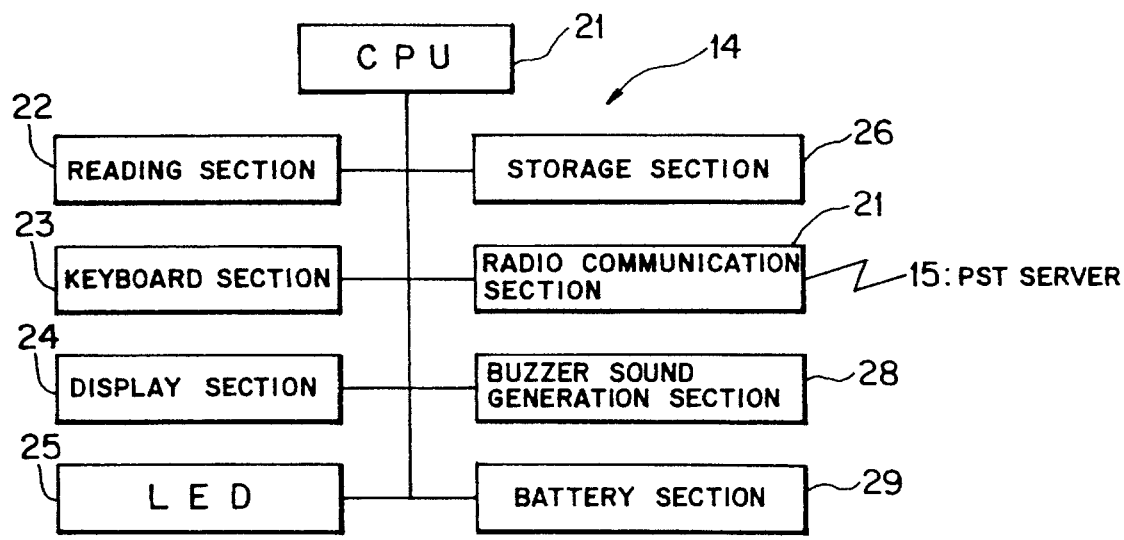
FIG. 4 is a block diagram showing a hardware construction of a PST employed in the self-scanning POS system shown in FIG. 3.

Referring now to FIG. 4, there is shown a hardware construction of a PST 14. The PST 14 shown includes a CPU (central processing unit) 21 serving as execution sales price determination means, use rejection notification means and control means. The CPU 21 thus performs necessary processing such as calculation processing and controls the PST 14.

The PST 14 further includes a reading section 22 serving as commodity code reading means and commodity identification information inputting means. The reading section 22 optically reads a membership number (bar code) as customer identification information unique to a customer and a bar code as commodity code information and is constituted by a bar code reader.

Here, the membership number as customer identification information unique to a customer is read, for example, from a membership card possessed by the member and having a membership number represented by a bar code.

The PST 14 further includes a keyboard section 23 having various keys thereon, which will be hereinafter described, so that various information may be inputted by operation of the keys by a customer.

The PST 14 further includes a display section 24 serving as display means for displaying thereon various transaction information including a commodity name, a sales price, discount information, the consumption tax and a total amount of money as well as notification information to be notified to a customer including an alarm.

The PST 14 further includes an LED (light emitting diode) 25 which emits light when reading of a bar code is performed regularly by the reading section 22 or in some other suitable cases, and a buzzer sound generation section 28 which generates buzzer sound to give a warning to a customer when reading of a bar code is not performed regularly by the reading section 22 or against a dishonest act.

The PST 14 further includes a storage section 26 for storing various data. In the present embodiment, the storage section 26 functions as storage means for temporarily storing detailed transaction information (a commodity name and a price of a commodity whose commodity code has been read, the consumption tax, a total amount of money and so forth) including commodity information based on commodity code information of a commodity read during shopping by a customer willing to buy the commodity or a result of sales price calculation which will be hereinafter described.

The PST 14 further includes a radio communication section (commodity code information notification means, first terminal identification information notification means, detailed transaction information notification means) 21 which performs communication of commodity purchase information, terminal identification information and so forth with the PST server 15 which serves as a host apparatus to the PST 14 or with the host apparatus 16 or the controller 17 (settlement POS terminal 18) of the POS apparatus 19 by way of the PST server 15.

The PST 14 further includes a battery section 29 which functions as a power source for supplying power to components of the PST 14. Here, the power supply by the battery section 29 is controlled such that, when the PST 14 is in a waiting condition or queue in the store, the power supply is automatically cut to render the PST 14 into an inoperative or resting condition, but when the PST is put into use, the power supply is automatically started to cancel the resting condition of the PST 14.

Figure 11:
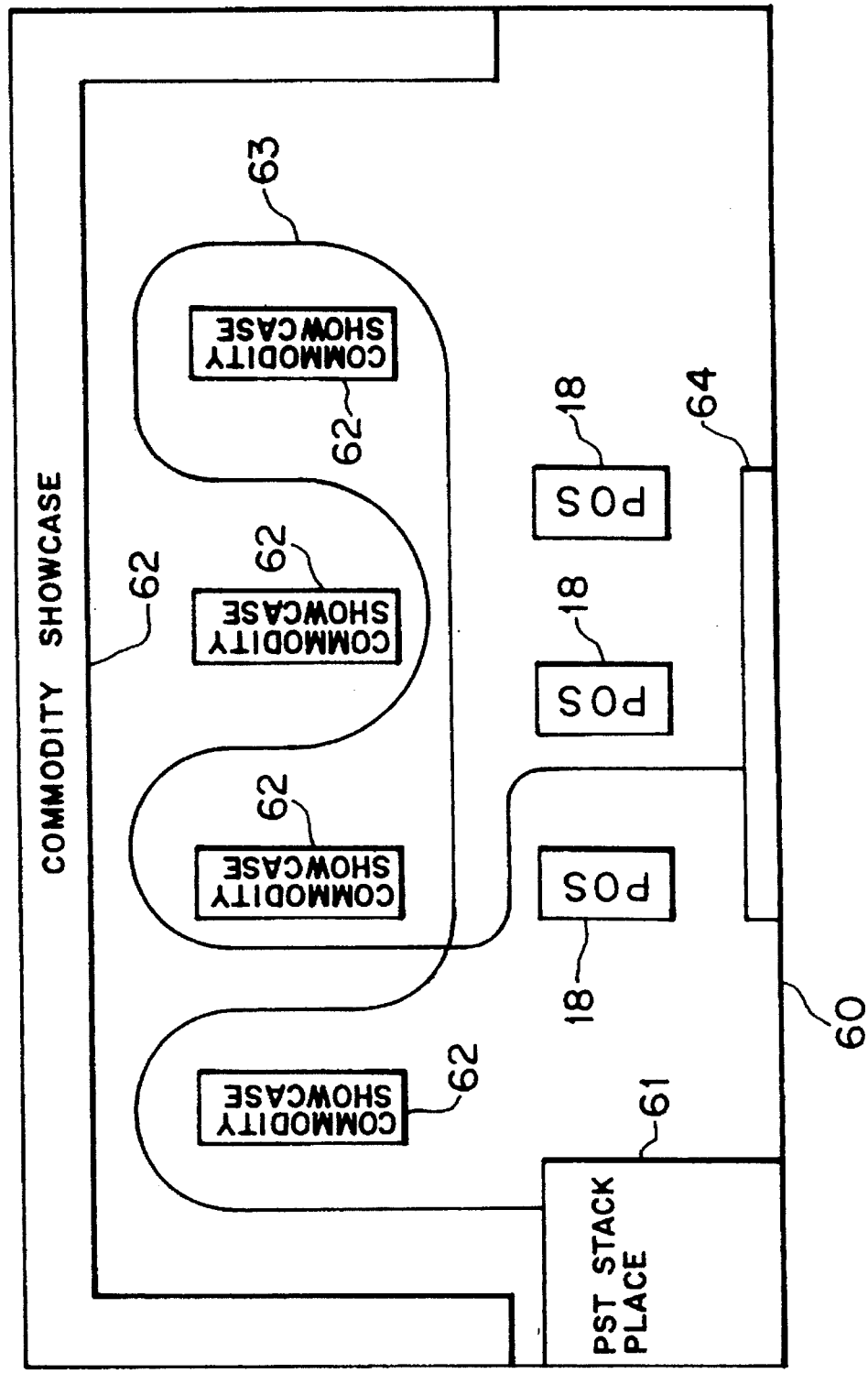
FIG. 11 is a diagrammatic representation showing a layout in a shop in which the self-scanning POS system shown in FIG. 3 is employed when a customer walks around to purchase commodities.

More particularly, the resting condition of the PST 14 is canceled when a customer inserts a coin (for example, a coin of 100 Yen) placed at a PST stack place 61 in a store 60 shown in FIG. 11. Then, when the PST 14 is returned regularly to the PST stack place 61, the coin is returned to the customer and the PST 14 is put into a resting condition again.

Figure 5:
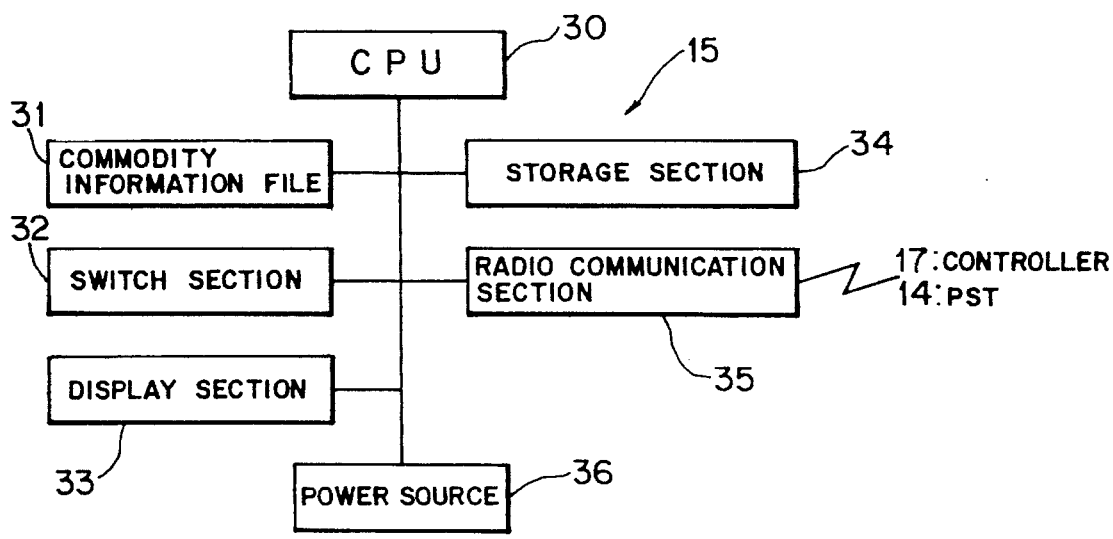
FIG. 5 is a block diagram showing a hardware construction of a PST server of the self-scanning POS system shown in FIG. 3.

FIG. 5 shows the hardware construction of the PST server 15. Referring to FIG. 5, the PST server 15 includes a CPU (commodity information retrieval means, determination means, detailed transaction information requiring means) 30 for controlling the PSTs 14.

The PST server 15 further includes a commodity information file (PLU file) 31 in which a category code, a commodity number, a commodity name, a unit price (price) and so forth corresponding to each commodity code information are stored.

The PST server 15 further includes a switch section 32 which includes keys, buttons and some other elements adapted to be manually operated by an operator to operate the PST server 15. One of the elements of the switch section 32 is a reset switch for resetting the entire system.

The PST server 15 further includes a radio communication section (commodity information notification means) 35 which communicates commodity purchase information and some other necessary information with the PSTs 14 and relays to communicate commodity purchase information and some other necessary information between the PSTs 14 and the host apparatus 16 or the controller or controllers 17 (settlement POS terminal or terminals 18) of the POS apparatus 19.

The PST server 15 further includes a storage section 34 for storing various data. In the present embodiment, the storage section 34 functions as registration terminal control means (refer to reference numeral 48 in FIG. 8) which holds terminal identification information notified thereto from any of the PSTs 14 by way of the radio communication section 27 to control the operation condition of the PST 14.

The PST server 15 further includes a display section 33 for displaying thereon various messages such as an error message to an operator, and a power source 36 for supplying power to the components of the PST server 15.

Figure 7:
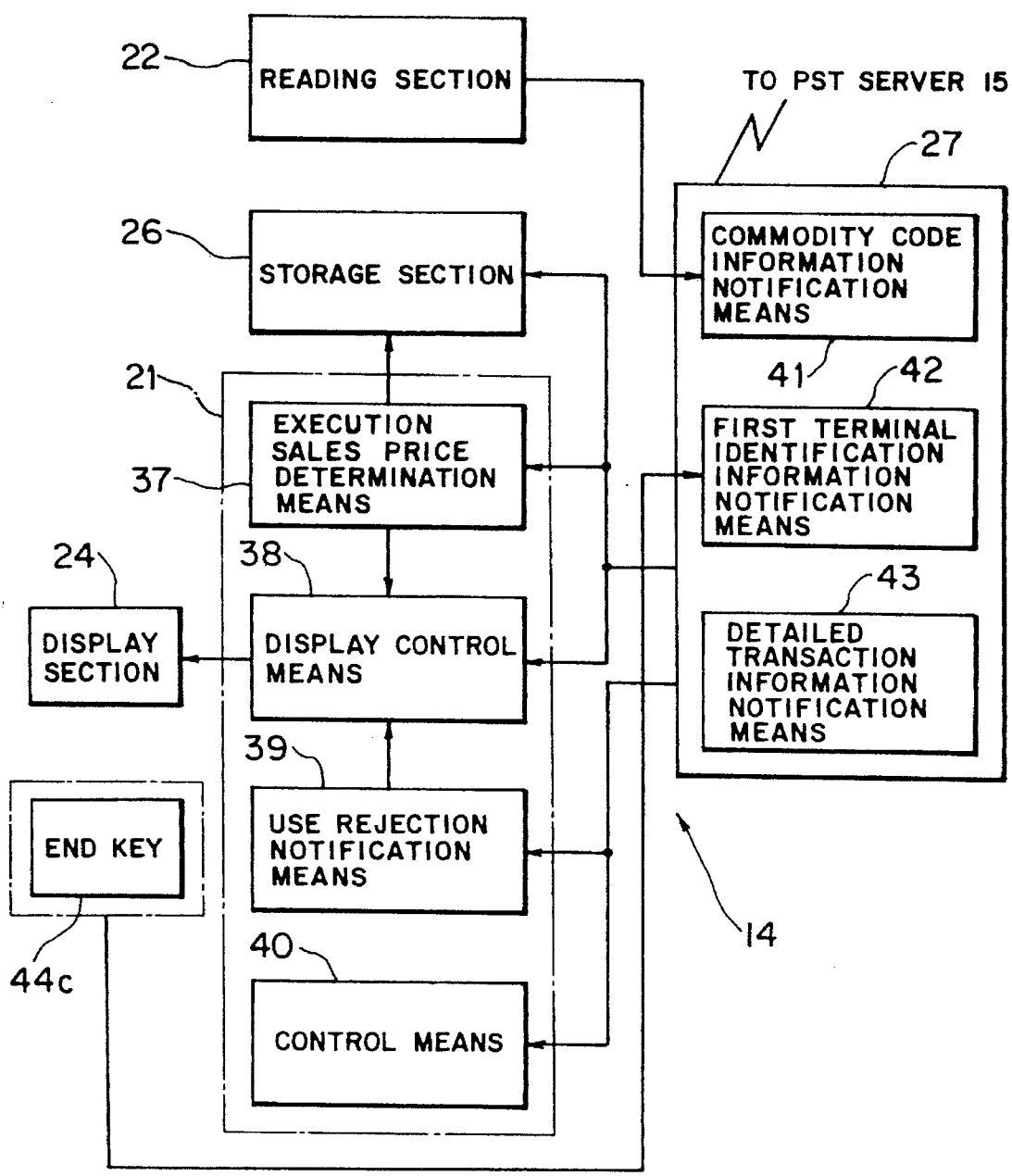
FIG. 7 is a block diagram showing a functional construction of the PST shown in FIG. 4.

FIG. 7 is a block diagram showing the functional construction of a PST 14, and each PST 14 is functionally constructed in such a manner as shown in FIG. 7.

Referring to FIG. 7, the CPU 21 performs such functions as execution sales price determination means 37, display control means 38, use rejection notification means 39 and control means 40.

The execution sales price determination means 37 calculates and determines a sale price of a commodity code whose commodity code has been read based on commodity code information notified from the PST server 15 by way of the radio communication section 35.

The display control means 38 controls the display section 24 so that commodity information notified from the PST server 15 by way of the radio communication section 35 or commodity information such as a sale price of a commodity determined by the execution sales price determination means 37 may be displayed on the display section 24.

The use rejection notification means 39 receives information inputted to the radio communication section 27 by way of the PST server 15 and outputs, when use of the PST 14 is to be rejected, an instruction to the display control means 38 to display a predetermined screen display on the display section 24 in order to notify such rejection to the customer.

The control means 40 receives information inputted to the radio communication section 27 by way of the PST server 15 from the POS apparatus 19 and disables use of the PST 14 when the information indicates that use of the PST 14 is to be rejected, but enables use of the PST 14 when the information indicates that use of the PST 14 is to be accepted.

Figure 10:
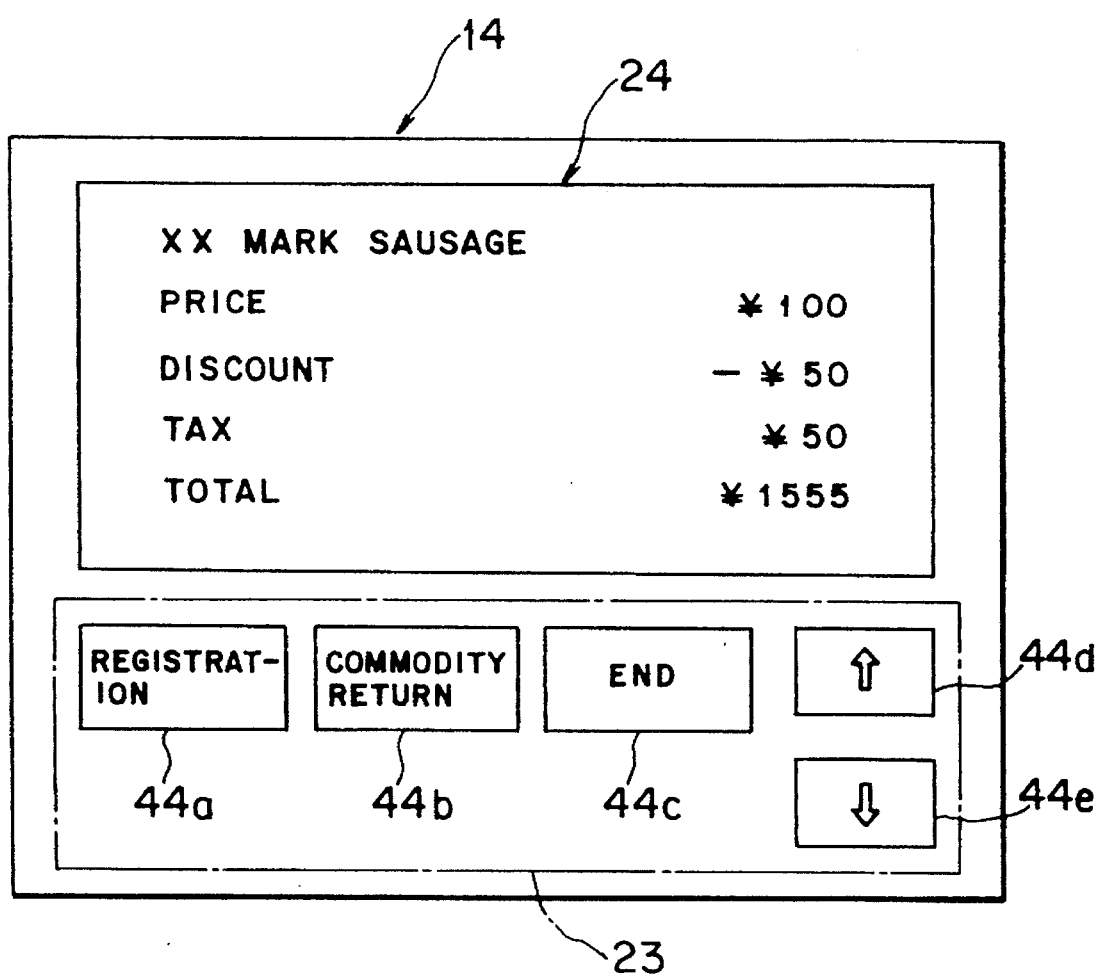
FIG. 10 is a schematic view showing an key arrangement of the PST shown in FIG.

Meanwhile, the keyboard section 23 is adapted to be manually operated by a customer and is located, for example, below the display section 24 as shown in FIG. 10.

The keyboard section 23 includes a registration key 44a for reading and registration of a commodity code of a commodity to be purchased, a commodity return key 44b for returning of a commodity, an end key 44c which is operated when shopping is to be ended, and a pair of scroll keys ("↑" and "↓") 44d and 44e for moving the screen of the display section 24 upwardly and downwardly, respectively.

The storage section 26 functions as storage means for temporarily storing detailed transaction information including commodity purchase information based on commodity code information from the PST server 15 received by the radio communication section 27 and information regarding a sales price of the commodity determined by the execution sales price determination means 37 as described hereinabove.

The display section 24 displays detailed transaction information including a fixed price and a discounted sales price of a purchased commodity, the consumption tax, a total amount of money and so forth as shown, for example, in FIG. 10 under the control of the display control means 38.

The radio communication section 27 has functions as commodity code information notification means 41, first terminal identification information notification means 42 and detailed transaction information notification means 43.

The commodity code information notification means transmits and notifies commodity code information to the PST server 15 by way of a radio signal when a commodity code is read by the reading section 22.

The first terminal identification information notification means 42 transmits and notifies, when a customer ends its shopping and manually operates the end key 44c of the keyboard section 23, terminal notification information (for example, a registered terminal number) unique to a PST 14 on which the end key 44c is operated to the PST server 15 by way of a radio signal.

The detailed transaction information notification means 43 notifies detailed transaction information stored in the storage section 26 to the POS apparatus 19 by way of the PST server 15 when it requested by detailed transaction information requesting means 47 of the CPU 30 of the PST server 15, which will be hereinafter described, to notify detailed transaction information.

Figure 8:
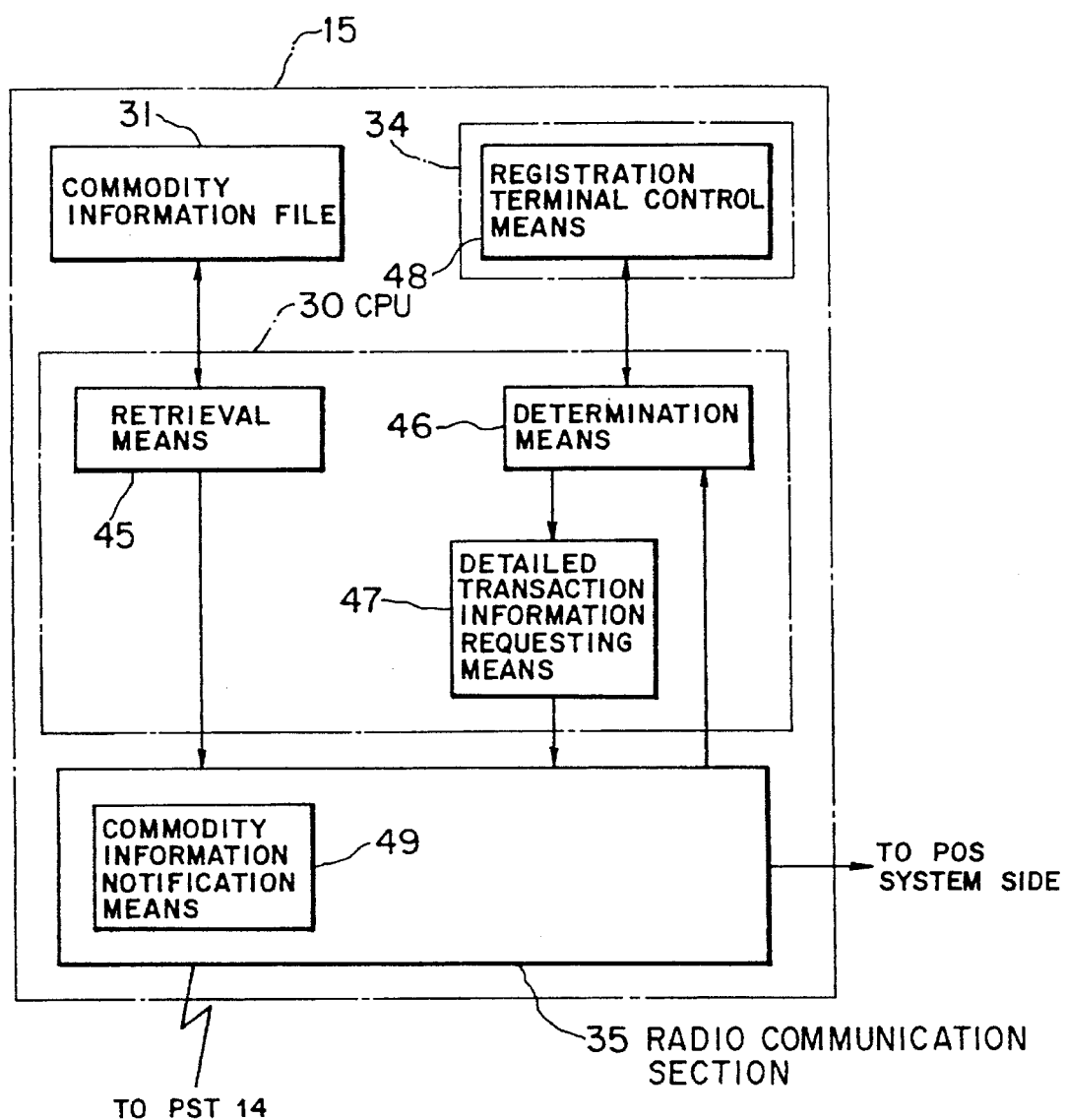
FIG. 8 is a block diagram showing a functional construction of the PST server shown in FIG. 5.

FIG. 8 shows the functional construction of the PST server 15. Referring to FIG. 8, the storage section 34 has a function as registration terminal control means 48 for holding terminal identification information notified thereto from any PST 14 by way of the radio communication section 27 to control the operation condition of each PST 14.

Meanwhile, the CPU 30 has functions as retrieval means 45, determination means 46 and detailed transaction information requesting means 47.

The retrieval means 45 refers to the commodity information file 31 to retrieve commodity information of a commodity corresponding to commodity code information notified from the radio communication section 27 of a PST 14 by way of the commodity code information notification means 41.

The determination means 46 receives terminal identification information (a terminal number) of any PST 14 from a settlement POS terminal 18 of the POS apparatus 19 which will be hereinafter described and determines whether or not the terminal identification information is held in the registration terminal control means 48 of the storage section 34 before it requests detailed transaction information for use for final settlement of the accounts.

The detailed transaction information requesting means 47 requests, when it is determined by the determination means 46 that terminal identification information is held in the registration terminal control means 48, notification of detailed transaction information stored in the storage section 26 to the PST 14 corresponding to the terminal identification information.

The radio communication section 35 has a function as the commodity code information notification means 41 which notifies commodity information retrieved by the retrieval means 45 to a PST 14 from which commodity code information has been notified.

Figure 9:
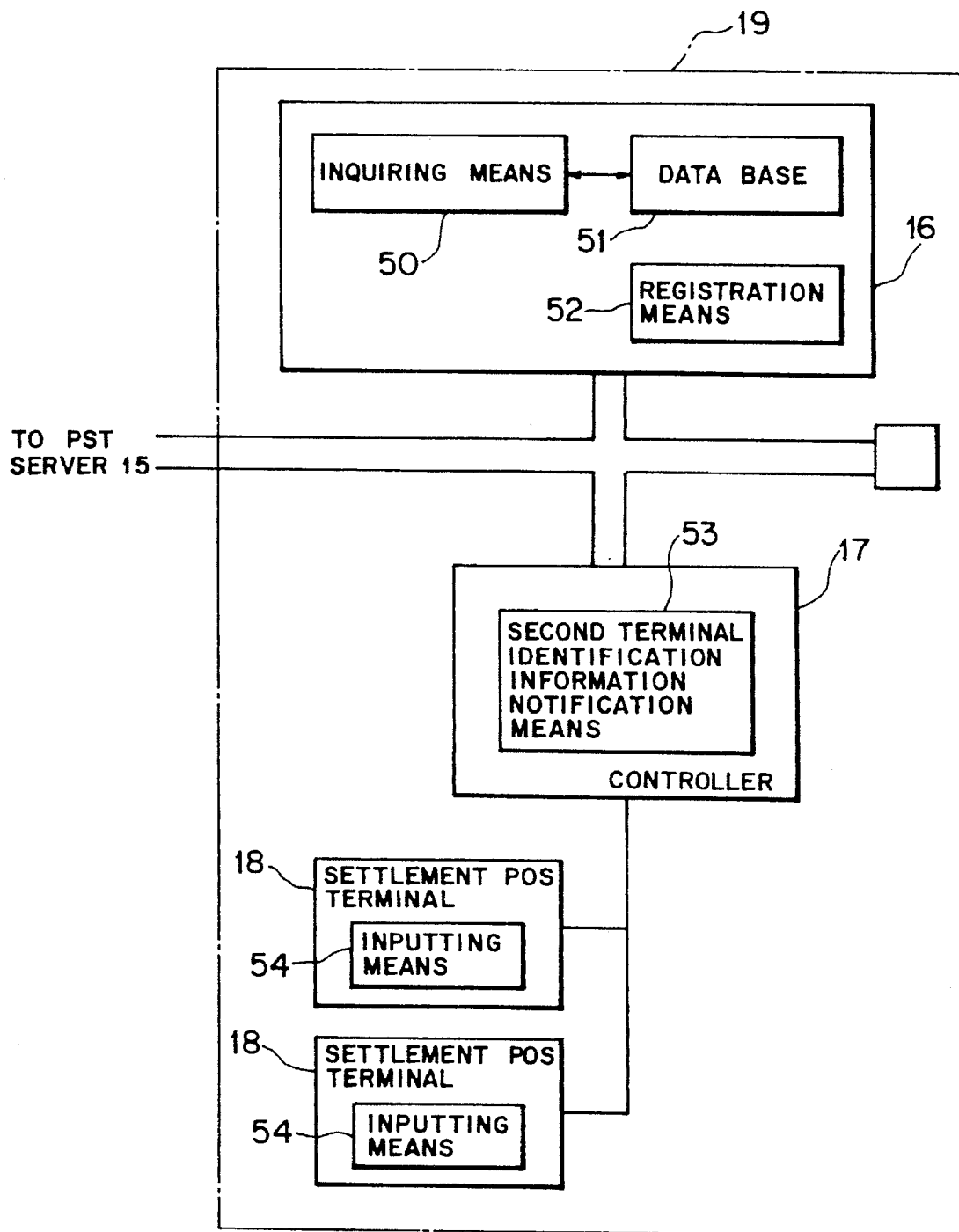
FIG. 9 is a block diagram showing a functional construction of the POS system shown in FIG. 3.

FIG. 9 shows the functional construction of the POS apparatus 19. Referring to FIG. 9, the host apparatus 16 of the POS apparatus 19 includes such functions as inquiring means 50, a data base 51 and registration means 52.

The inquiring means 50 receives customer identification information such as a membership number inputted from the reading section 22 by way of the PST server 15 and refers to the data base 51 which will be described below to determine whether use of a PST 14 by a customer corresponding to the customer identification information is to be accepted or rejected.

In particular, for example, when it is registered in the data base 51 that a membership card possessed by a customer has been lost, if commodity identification information of the customer is inputted to the reading section 22, then the inquiring means 50 determines that use of a PST 14 is to be rejected (NG). However, when there is no reason to determine rejection of use of a PST 14, the inquiring means 50 determines that use of a PST 14 is to be permitted (OK). In this manner, the inquiring means 50 can determine permission or rejection of use of a PST 14 in accordance with the negative checking method.

The data base (customer data base) 51 has commodity purchase information of individual customers stored for individual customer identification information therein and has stored therein, in addition to the commodity purchase information, information for rejecting use of a membership card due to various reasons.

The registration means 52 registers commodity purchase information, which is transmitted thereto by way of the PST server 15 from a PST 14 when a customer purchases a commodity using the PST 14, into the data case 51 in accordance with the commodity identification information.

Each of the settlement POS terminals 18 is provided to effect final settlement of the accounts for a commodity or commodities to be purchased. The settlement POS terminal 18 includes inputting means 54 for inputting, after detailed transaction information is notified from a PST 14, commodity information to be registered into or modify the detailed transaction information.

Further, the control 17 controls settlement POS terminals 18 associated therewith and includes second terminal identification information notification means 53 for notifying, when terminal identification information (a terminal number) of a PST 14 is inputted from a settlement POS terminal 18, the terminal identification information to the PST server 15.

Operation of the self-scanning POS system having the construction described above as the first embodiment of the present invention will be described below with reference to FIGS. 11 to 13. Here, FIG. 11 shows a layout of the store in which a customer effects shopping, and FIG. 12 illustrates operation of the system of the present embodiment while FIG. 13 illustrates operation of a settlement POS terminal 18.

Figure 12:
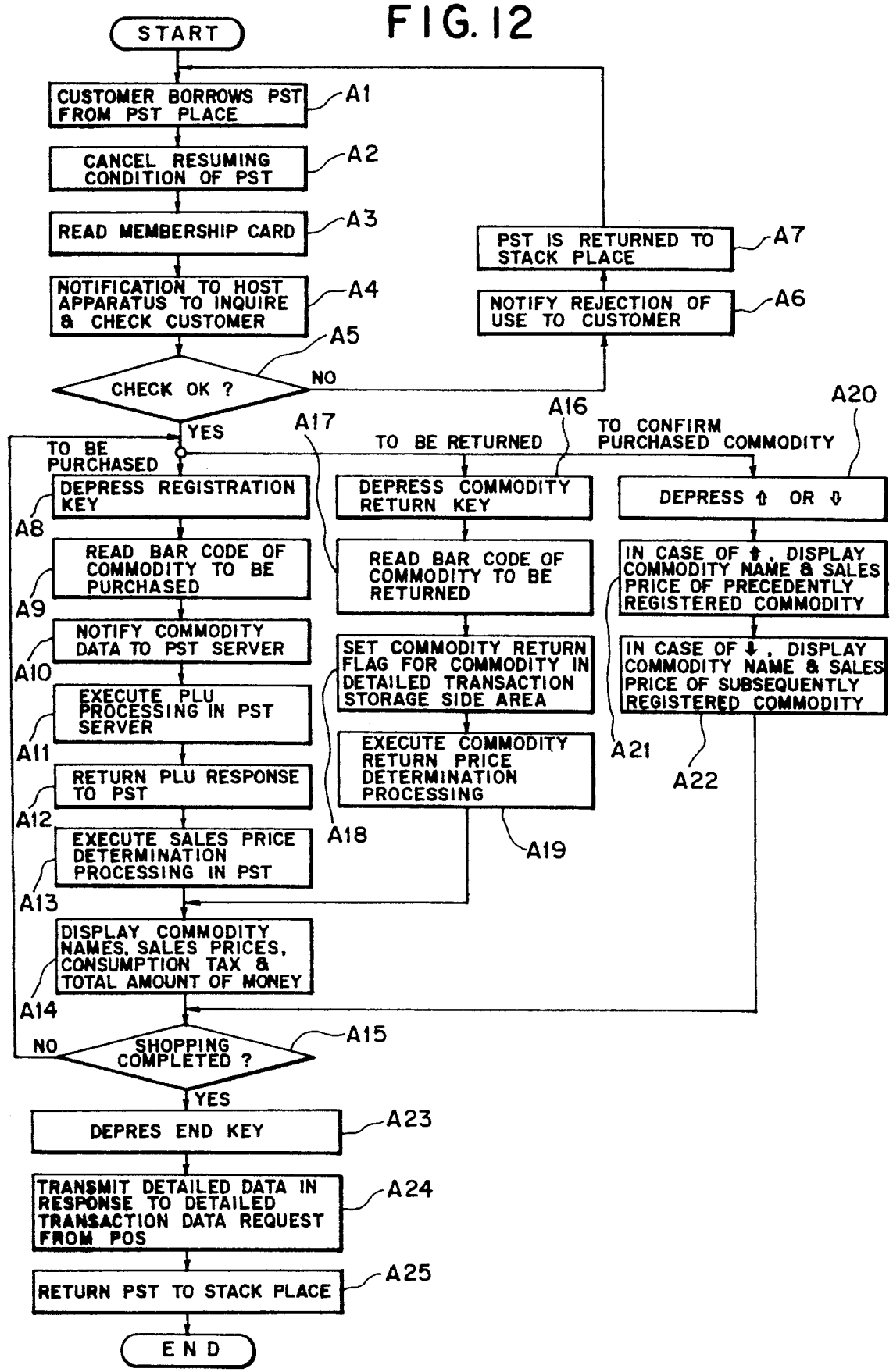
FIG. 12 is a flow chart illustrating operation of the self-scanning POS system shown in FIG.
Figure 13:
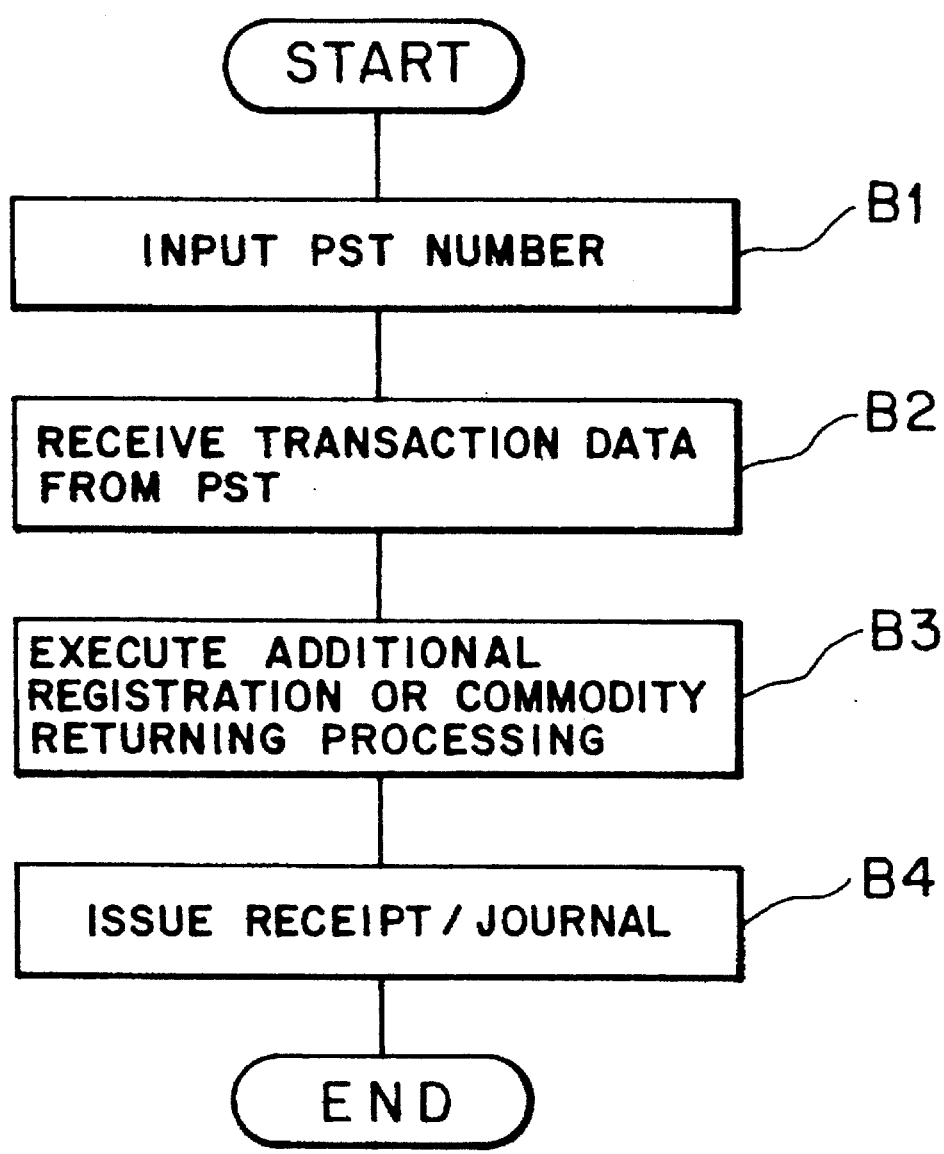
FIG. 13 is a flow chart illustrating operation of a settlement POS terminal employed in the self-scanning POS system shown in FIG.

Referring first to FIG. 12, when a customer tries to start its shopping in the store 60, for example, it will take out a PST 14 from the PST stack place 61 in the store 60 shown in FIG. 11 (step A1). When the PSTs 14 are stacked in the PST stack place 61, they are in their resting condition, but when a PST 14 is taken out, the resting condition of the PST 14 is canceled. Thus, the PST 14 thus taken out is rendered active by the battery section 29 (step A2).

Subsequently, upon starting use of the PST 14, the customer will perform a reading operation of a membership number (bar code) as customer identification information recorded on its membership card by means of the reading section 22 (step A3). The membership number is notified from the radio communication section 27 of the PST 14 to the host apparatus 16 of the POS apparatus 19 by way of the radio communication section 35 of the PST server 15, and the inquiring means 50 of the host apparatus 16 makes inquiries about the membership number (step A4).

If customer identification information of the customer is inputted to the reading section 22 when it is registered that, for example, the membership card possessed by the customer has been lost, then the host apparatus 16 determines that use of the PST 14 is to be rejected (determination of NO at step A5), but if there is no reason to reject use of the PST 14, the host apparatus 16 determines that use of the PST 14 is to be permitted (determination of YES at step A5).

Here, if it is determined that the use is to be permitted OK), the customer can use the PST 14, but if it is determined that the use is to be rejected (NG), the customer cannot use the PST 1.4. Such permission or rejection is displayed on the display section 24 of the PST 14 by the use rejection notification means 39 and the display control means 38 to notify the same (step A6).

Further, when it is determined in this instance that the use is to be permitted, use of the PST 14 is enabled by the control means 40, but when it is determined conversely that the use is to be rejected (NG), use of the PST 14 is disabled by the control means 40.

When the notification that the PST 14 cannot be used is received at step A6, the customer will return the PST 14 to the PST stack place 61 (step A7).

On the other hand, when it is determined at step A5 that use of the PST 14 is to be permitted, the customer can start its shopping using the PST 14. In particular, the customer will perform a reading operation of a commodity code (bar code) of a commodity to be purchased. In this instance, the customer will first depress the registration key 44a (step A8) and then read in the bar code of the commodity to be purchased by means of the reading section 22 (step A9).

The information read by the reading section 22 is notified to the CPU 30 of the PST server 15 by way of the radio communication section 27 (commodity code information notification means 41) (step A10). The CPU 30 thus refers to the commodity information file 31 by means of the retrieval means 45 to retrieve commodity information such as a price of the commodity from which the bar code has been read (step A11).

Then, after commodity information is retrieved by the CPU 30 of the PST server 15, the commodity information is transmitted to the radio communication section 35 (commodity information notification means 49) so that it is notified to the original PST 14 (step A12).

In the PST 14, the execution sales price determination means 37 of the CPU 21 calculates a sales price based on the commodity information such as a commodity name and price information notified from the PST server 15 (step A13). The sales price is determined taking discount sales conditions such as a reduction in price, a discount and a mass sales. Also, the consumption tax and a total amount of money are calculated. Further, the commodity name and the sales price of the commodity read from the bar code, the consumption tax and the total amount of money are displayed on the display section 24 by the display control means 38 (step A14, refer to FIG. 10).

The customer will visually discern the contents displayed on the display section 24 to confirm that the commodity has been registered and put the commodity into the basket member (not shown) of the PST 14, thereby completing the series of steps of the commodity code reading (registering) operation.

Whenever the customer wants to return the commodity registered by way of the processing at steps A8 through A14 described above, the customer will first depress the commodity return key 44b of the PST 14 (step A16) and then read the bar code of the commodity to be returned by means of the reading section 22 (step A17).

Then, a commodity return flag for the commodity in the detail storage area of the storage section 26 of the CPU 21 is set (step A18), and return commodity price determination processing is performed by the CPU 21 (step A19). Then, the consumption tax, the total amount of money and so forth after the commodity is returned are displayed on the display section 24 (step A14).

Further, when the customer wants to confirm the commodity or commodities registered by way of the processing at steps A8 to A14 described above, the customer will depress the upward scroll key 44d or the downward scroll key 44e (step A20).

In particular, when the scroll key 44d is depressed, the commodity name and the sales price of a commodity for which a reading (registering) operation has been performed precedently are displayed on the display section 24 (step A21), but when the scroll key 44e is depressed, the commodity name and the sales price of another commodity for which a reading (registering) operation has been performed subsequently are displayed on the display section 24 (step A22).

The customer will perform such a reading operation of a commodity code, commodity returning processing or confirmation processing of the purchased commodity or commodities as described above while walking around showcases 62 in the store 60, for example, as indicated by a route 63 (refer to FIG. 11). Then, when the customer determines that his or her shopping is completed (step A15), the customer will depress the end key 44c (step A23).

In response to such depression of the end key 44c, terminal identification information (for example, a registered terminal number) unique to the PST 14 on which the end key 44c has been operated is transmitted and notified to the PST server 15 by way of a radio signal by the first terminal identification information notification means 42 of the radio communication section 27.

In the PST server 15 receiving the terminal identification information unique to the PST 14 at the radio communication section 35 thereof, the registration terminal control means 48 of the storage section 34 holds the terminal identification information to control that the PST 14 is in an operation end condition.

The customer who has operated the end key 44c to end its purchasing of commodities will move the PST 14 to the location of one of the settlement POS terminals 18 of the POS apparatus 19 and effect final settlement of the accounts for the purchased commodities at the settlement POS terminal 18.

In the settlement POS terminal 18, the operator of the settlement POS terminal 18 will input the terminal number (terminal identification number, PST No.) of the PST 14 for which final settlement of the accounts is to be performed (step B1) and recall the detailed transaction information stored in the storage section 26 of the PST 14 by way of the PST server 15.

In particular, when the operator manually operates the settlement POS terminal 18 to input the terminal number of the PST 14, the terminal number is notified from the controller 17 to the radio communication section 35 of the PST server 15 by the second terminal identification information notification means 53.

In the PST server 15 which receives the notification, the determination means 46 of the CPU 30 determines based on the registration terminal control means 48 of the storage section 34 whether or not the PST 14 is in an operation end condition. When the PST 14 is in an operation end condition, the detailed transaction information requesting means 47 of the CPU 30 requests the PST 14 corresponding to the terminal number for notification of the detailed transaction information stored in the storage section 26 by the radio communication section 35.

Then, when the PST 14 receives the request for detailed transaction information (data), the detailed transaction information stored in the storage section 26 is notified to the settlement POS terminal 18 by way of the PST server 15 by the detailed transaction information notification means 43 of the radio communication section 27 (step A24 in FIG. 12).

When the detailed transaction information is notified from the PST 14 (step B2 in FIG. 13), final settlement of the accounts is performed on the settlement POS terminal 18 by the operator. Here, if additional registration or commodity returning processing of a commodity is requested by the customer, the inputting means 54 will be manually operated to effect an inputting operation for registration or modification of commodity information such as additional registration or commodity returning processing of a commodity into or to the detailed transaction information (step B3), whereafter settlement of the accounts is performed.

Thereafter, the settlement POS terminal 18 issues a receipt/journal (step B4), thereby completing the final settlement of the accounts for the purchased commodities. Then, the customer will bag the purchased commodities with a sacker table 64 (refer to FIG. 11) and then return the used PST 14 to the PST stack place 61 (step A25 in FIG. 12).

The operations beginning with starting of shopping and ending with returning of the purchased commodities by the customer described above are performed while the PST 14 is moved along the route 63 in the store 60 in FIG. 11.

In this manner, with the self-scanning POS system of the first embodiment of the present invention, only by providing the PST server 15 newly, a plurality of PSTs 14 can be accommodated into the POS apparatus 19 having the substantially same construction as that of an existing POS apparatus, and a system having a self-scanning function can be built up very readily with a minimized cost.

Further, in the present embodiment, since detailed transaction information stored in the storage section 26 of a PST 14 is transmitted, upon ending of shopping, from the PST 14 to a settlement POS terminal 18 by way of the PST server 15 and the controller 17 and settlement processing can be performed with the settlement POS terminal 18, only by adding means for communication with the PST server 15 to the existing POS apparatus 19, the time required for settlement processing with the settlement POS terminal 18 can be reduced remarkably and the waiting time can be reduced, and consequently, little or no waiting time at a settlement place prevents a customer from having a disagreeable feeling. Further, also the operation of the operator can be reduced. As a result, reduction of the shopping time and the convenience in the self-shopping form can be achieved.

Further, in the present embodiment, since a PST 14 which has been put into a commodity purchase end condition as a result of operation of the end key 44c is controlled by the registration terminal control means 48 of the PST server 15, if a PST 14 which is in a resting condition or remains in an operating condition is requested, upon final settlement of the accounts at a settlement POS terminal 18, for detailed transaction information in error as a result of an operation error of an operator, delivery of detailed transaction information of the different PST 14 to the settlement POS terminal 18 is prevented. Consequently, the reliability in final settlement of the accounts at the settlement POS terminal 18 can be assured.

Further, since inputting for registration of or modification of commodity information into or to detailed transaction information notified from a PST 14 can be performed by the inputting means 54 of a settlement POS terminal 18 upon final settlement of the accounts at the settlement POS terminal 18, registration of a commodity which has not been read or registered into the PST 14 by the reading section 22 or modification for a commodity for which the sales price is to be changed urgently or a like commodity can be performed. Here, inputting from the inputting means 54 can be performed by manual inputting by an operator from a keyboard such as ten keys or by a reading operation by means of a bar code reader or a similar apparatus.

Further, by reading, upon starting of use of a PST 14, a membership number by means of the reading section 22 and making inquiries about a membership number by means of the inquiring means 50 of the host apparatus 16, it can be determined whether or not the user of the PST 14 is a proper member. When the membership number coincides with data for negative checking, it is determined that use of the PST 14 is to be rejected, and not only such rejection is notified to the user of the PST 14 but also use of the PST 14 is disabled by the control means 40 of the PST 14. Consequently, unjust use of a membership card can be prevented with certainty.

Further, in the present embodiment, since the reading section 22 serves also as the customer identification information inputting means, there is no need of additionally providing such customer identification information inputting means, and a system for identification of a customer can be introduced at a low cost without reconstructing the hardware on the PST 14 side.

Furthermore, commodity purchase information from the individual PSTs 14 is registered in the data base 51 of the host apparatus 16 for the individual customers and shopping time and a sales condition are managed for the individual customers. Thus, by analyzing the information, enhancement of the service to the individual customers can be achieved.

It is to be noted that, while the reading section 22 in the present embodiment reads information of a membership number or a commodity code in the form of a bar code, according to the present invention, the form of information is not limited to a bar code, and for example, information in the form of a magnetic code may be read by means of a magnetic code reader.

Figure 14:
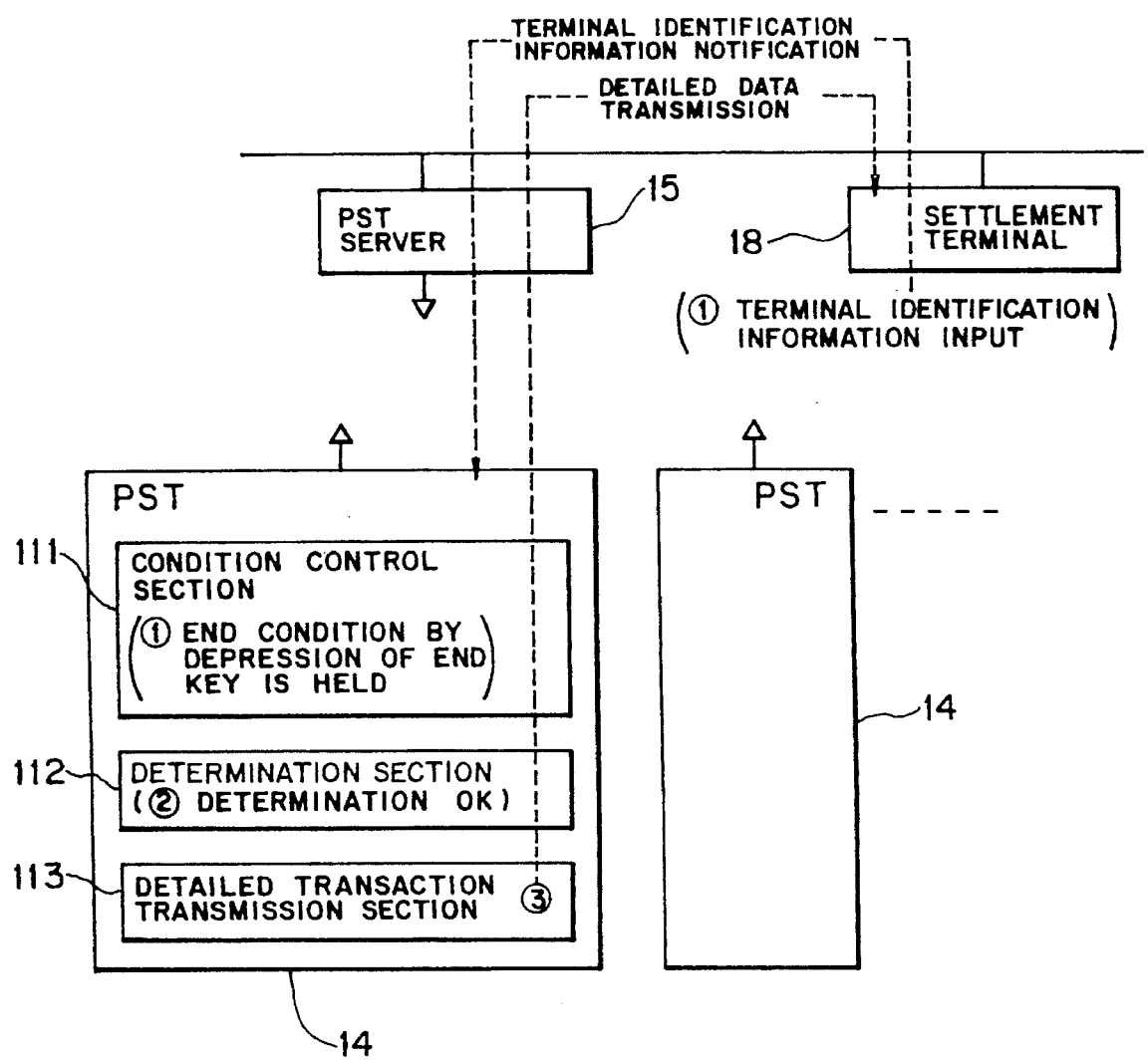
FIG. 14 is a block diagram showing an outline of a modified self-scanning POS system.

FIG. 14 shows an outline of a self-scanning POS system as a modification to the self-scanning POS system of the first embodiment of the present invention described above. The modified self-scanning POS system is basically similar to but is different from the self-scanning POS system of the first embodiment only in that it includes a condition management section (condition management means) 111, a determination section (determination means) 112 and a detailed transaction transmission section (detailed transaction transmission means) 113.

In particular, referring to FIG. 14, the POS system (POS apparatus) 19 includes terminal identification information notification means for notifying, when terminal identification information of a PST (self-scanning registration terminal) 14 is inputted from a settlement POS terminal 18 (settlement terminal), the terminal notification information to the PST 14 corresponding to the terminal identification information by way of the controller (refer to reference numeral 17 of FIG. 3).

Meanwhile, the condition management section 111 receives an on/off operation of the end key or the like (not shown) and controls and holds an end condition of the PST 14. The determination section 112 refers to the condition management section 111 to determine whether or not the PST 14 is in an end condition when terminal identification information is notified from the POS apparatus 19 by the terminal identification information notification means. The detailed transaction transmission section 113 notifies detailed transaction information stored in the storage section (refer to reference numeral storage section 26 in FIGS. 4 and 7) to the settlement POS terminal 18 at the POS apparatus 19 by way of the host apparatus when it is determined by the determination section 112 that the PST 14 is in an end condition.

In the modified self-scanning POS system of the construction described above to the self-scanning POS system of the first embodiment of the present invention, when a customer ends a scanning operation of a commodity or commodities to be purchased and effects settlement of the accounts at a settlement POS terminal 18, terminal identification information (for example, No. 2 in terminal number) of the PST 14 is inputted from the settlement POS terminal 18 by an operation of an operator (refer to ① in FIG. 14).

Then, the terminal identification information is notified to the corresponding PST 14 by way of the host apparatus, and it is determined by the determination section 112 whether or not it is controlled and held by the condition management section 111 that the PST 14 is in an end condition (refer to ② in FIG. 14).

Then, when it is determined by the determination section 112 that the PST 14 is in an end condition, the detailed transaction transmission section 113 notifies the detailed transaction information stored in the storage section to the settlement POS terminal 18 by way of the host apparatus (refer to ③ of FIG. 14).

Consequently, the customer can proceed with a settlement procedure similarly as in the self-scanning POS system of the first embodiment described above.

In this manner, also with the modification to the self-scanning POS system of the first embodiment of the present invention, similar advantages to those of the first embodiment can be achieved.

Figure 15:
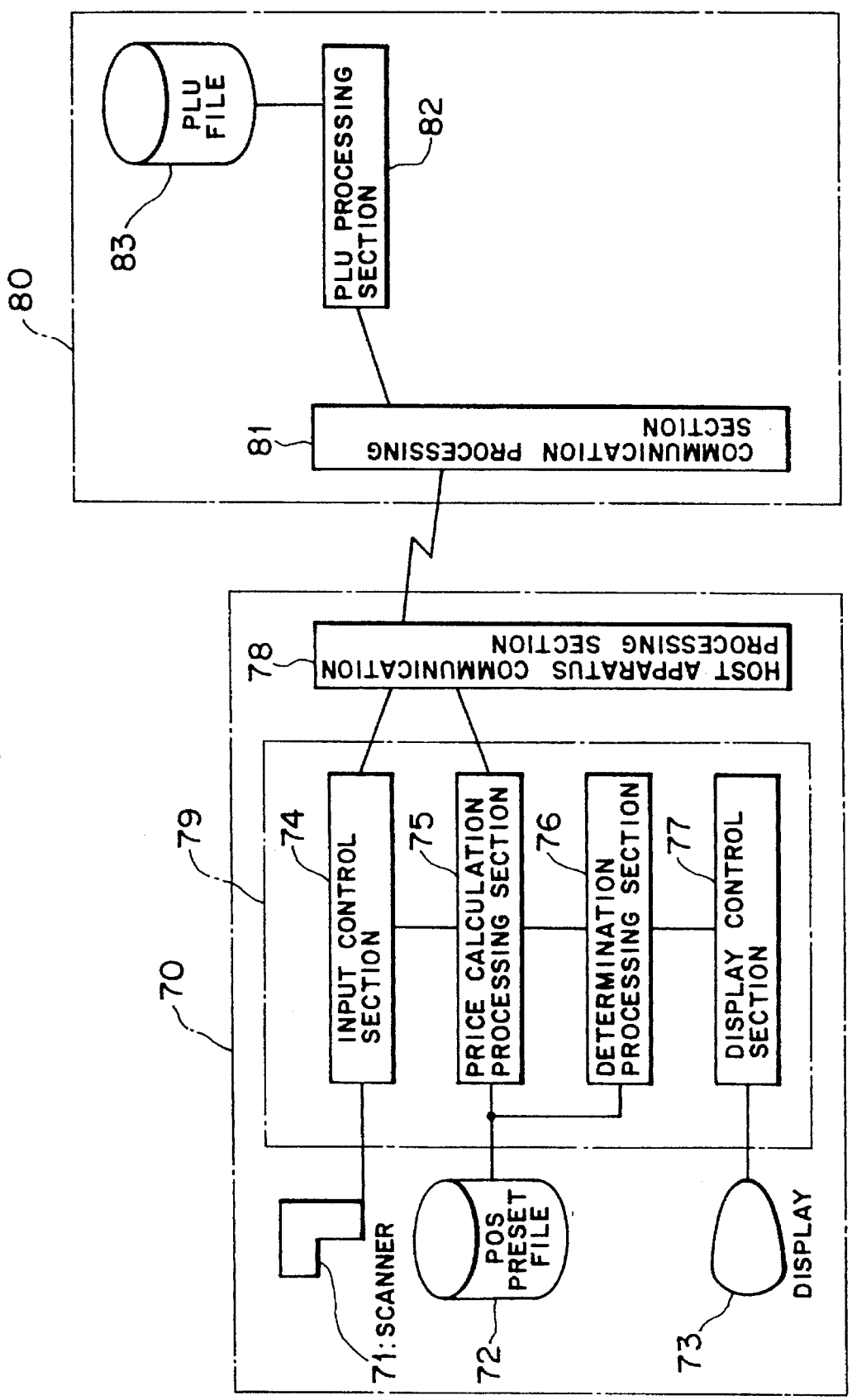
FIG. 15 is a block diagram showing another self-scanning POS system according to a second preferred embodiment of the present invention.

FIG. 15 shows a self-scanning POS system according to a second preferred embodiment of the present invention. Referring to FIG. 15, the self-scanning POS system includes a self-scanning apparatus 70 which reads a commodity code applied to a commodity to be purchased and accommodates the commodity, whose commodity code has been read, into a basket member not shown. The self-scanning apparatus 70 includes a scanner 71, a POS preset file 72, a display unit 73, a host apparatus communication processing section 78 and a CPU 79.

The CPU 79 controls the self-scanning apparatus 70 and has functions as an input control section 74, a price calculation processing section 75, a determination processing section 76 and a display control section 77.

The scanner (commodity code reading means) 71 reads commodity code information such as a bar code or magnetic code information applied to a commodity.

The POS preset file (preset file) 72 has various sales conditions including a predetermined sales condition stored therein for individual commodities. In particular, the POS preset file 72 has stored therein as illustrated in FIG. 19 discount sales conditions such as a time service condition in which a price is reduced when a particular commodity is purchased within a predetermined period of time, a bundle condition in which a price is reduced when a particular commodity purchased by a particular number or quantity, a mix-match condition in which a price is reduced when a plurality of different kinds of particular commodities are purchased in combination or a pair match condition in which a price is reduced when a plurality of kinds of particular commodities are purchased for all kinds as well as such sales conditions as distinction between included/excluded laying of the consumption tax on a commodity for individual commodity categories.

The display unit 73 displays commodity information regarding a commodity from which a commodity code has been read by the scanner 71.

The input control section 74 of the CPU 79 reads a commodity code read by the scanner 71 into the CPU 79 and outputs the commodity code to the host apparatus communication processing section 78.

The determination processing section (discount sales condition determination means) 76 receives commodity information notified from a communication processing section 81 of a host apparatus (control apparatus) 80 which will be hereinafter described, reads out sales conditions stored in the POS preset file 72 and determines whether or not any of the sales conditions is satisfied.

The price calculation processing section (execution sales price determination means) 75 reads out, based on commodity information from the communication processing section 81 of the host apparatus 80, sales conditions of the commodity stored in the POS preset file 72 and calculates and determines a sales price of the commodity, from which the commodity code has been read by the scanner 71, based on the sales conditions and the commodity information notified from the communication processing section 81 of the host apparatus 80.

The display control section (display control means) 77 edits display data in accordance with which a price of a commodity from which the commodity code has been read by the scanner 71 is to be displayed on the display unit 73.

The host apparatus communication processing section (commodity code information notification means) 78 communicates with the host apparatus 80 to notify commodity code information read by the scanner 71 to the host apparatus 80.

The host apparatus 80 controls the self-scanning apparatus 70 and has functions as a communication processing section 81, a PLU processing section 82 and a PLU file 83.

The PLU file (commodity information file) 83 has stored therein commodity information such as price information of commodities corresponding to commodity codes.

The PLU processing section (commodity information retrieval means) 82 receives a commodity code, whose reading operation has been performed by a customer, by way of the host apparatus communication processing section 78 of the self-scanning apparatus 70 and the communication processing section 81 of the host apparatus 80, retrieves commodity information corresponding to the commodity code from the PLU file 83, and produces a PLU descending message as retrieved commodity information.

The communication processing section (commodity information notification means) 81 communicates with the host apparatus communication processing section 78 of the self-scanning apparatus 70 to notify commodity information retrieved by the PLU processing section 82 to the self-scanning apparatus 70.

Further, in the present embodiment, a mark "*" as display contents to be displayed on the display unit 73 of the self-scanning apparatus 70 when a predetermined discount sales condition is satisfied as commodity information of a commodity corresponding to a commodity code is stored in the PLU file 83 in advance therein, for example, as illustrated FIG. 16.

Accordingly, if a commodity code corresponding to commodity information which is stored including the mark "*" in the PLU file 83 is inputted from the self-scanning apparatus 70 to the PLU processing section 82 as a result of a reading operation by a customer, then the mark "*" as display contents is included in a PLU descending message produced by the PLU processing section 82 in addition to price information in an ordinary condition or some other price information of a commodity such as discount price information and so forth as seen from FIG. 17.

When it is determined by the price calculation processing section 75 that a discount sales condition is satisfied, the display control section 77 of the CPU 79 of the self-scanning apparatus 70 in the present embodiment edits and produces display data (refer to, for example, FIG. 18) for the display unit 73 based on commodity information (price) included in a PLU descending message from the host apparatus 80, the display contents "*" for the case when a discount sales condition is satisfied and the sales price determined by the price calculation processing section 75, and causes the display data to be displayed on the display unit 73 as shown in FIG. 20. Consequently, the price of the commodity with which a discount sales condition is satisfied can be displayed on the display unit 73 with the mark "*" applied thereto to notify such satisfaction of the discount sales condition to the customer.

Figure 21:
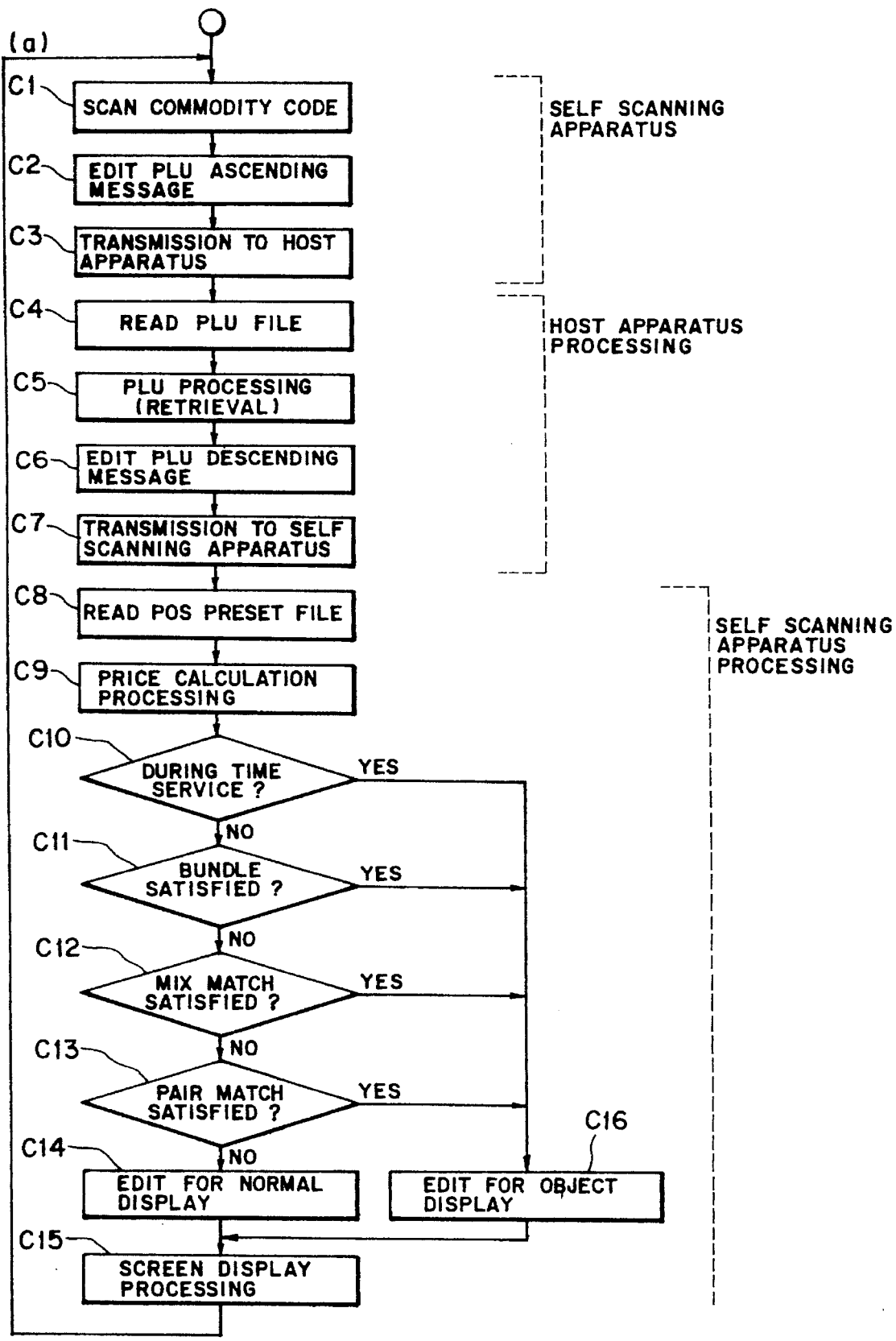
FIG. 21 is a flow chart illustrating operation of the self-scanning POS system shown in FIG. 15.

Operation of the self-scanning POS system having the construction described above according to the second preferred embodiment of the present invention will described below with reference to the flow chart shown in FIG. 21.

In particular, when a customer operates the scanner 71 to effect a reading operation of a commodity code of a commodity to be purchased (step C1), the input control section 74 edits commodity code information as a PLU ascending message (step C2). The commodity code information is transmitted from the host apparatus communication processing section 78 to the host apparatus 80 (step S3).

When the commodity code information is received by the communication processing section 81 of the host apparatus 80 and inputted to the PLU processing section 82, the PLU processing section 82 reads in commodity information stored in the PLU file 83 (step C4) and retrieves commodity code information corresponding to the commodity code information inputted thereto from the self-scanning apparatus 70 (step C5).

Then, after commodity information corresponding to the commodity code information is retrieved by the PLU processing section 82, a PLU descending message (refer to FIG. 17) is edited as a result of the retrieval (step C6), and the PLU descending message is transmitted to the self-scanning apparatus 70 by the communication processing section 81 (step C7).

In this instance, if a discount sales condition is set for the thus retrieved commodity, also the mark "*" to be displayed when a discount sales condition is satisfied is included in the commodity information of the PLU file 83 as seen in FIG. 16, and also the display contents are transmitted to the self-scanning apparatus 70.

When the host apparatus communication processing section 78 of the self-scanning apparatus 70 receives the PLU descending message from the host apparatus 80, the price calculation processing section 75 reads in the sales conditions stored in the POS preset file 72 (step C8) and calculates and determines a sales price of the commodity code, whose commodity code has been read by the scanner 71, based on the sales conditions read in and the PLU descending message (step C9).

In particular, if the commodity whose commodity code has been read in satisfies one of its discount sales conditions including a time service condition, a bundle condition, a mix match condition and a pair match condition, its discount sale price is determined as a sales price. On the contrary if the commodity does not satisfy any of the discount sales conditions, then a sales price in an ordinary case is determined as a sales price.

More particularly, the price calculation processing section 75 compares the current point of time with time information with which a time service condition is applied to the particular commodity, and when the current point of time falls within the time information, then the price calculation processing section 75 determines that the time service condition is satisfied (step C10). Subsequently, the price calculation processing section 75 determines whether or not the commodity whose commodity code has been read makes an object for a bundle condition or a mix-match condition, and if the commodity makes such object, then the price calculation processing section 75 determines whether or not the number of the commodities read in satisfies a condition. Then, if the condition is satisfied, then the price calculation processing section 75 determines that the bundle condition is satisfied (steps C11 and C12). Further, when the commodity code whose commodity code has been read in makes an object for a pair match condition, if all kinds of the commodity are purchased, then the price calculation processing section 75 determines that the pair match condition is satisfied (step C13).

On the other hand, if the commodity code whose commodity code has been read in does not satisfy any of the time service condition, the bundle condition, the mix-match condition and the pair match condition (step C10 to C13), ordinary display data to which the mark "*" is not applied are edited by the display control section 77 (step C14), and screen displaying processing is performed by the display unit 73 based on the thus edited display data (step C15).

However, when the commodity whose commodity code has been read in satisfies any one of the time service condition, the bundle condition, the mix-match condition and the pair match condition (steps C10 to C13), display data (refer to FIG. 18) for discount price display with the mark "*" applied thereto for displaying that the commodity satisfies a discount sales condition are edited by the display control section 77 (step C16). Then, screen displaying processing is performed by the display unit 73 as shown in FIG. 20 based on the thus edited display data (step C15).

After registration of the commodity to be purchased is performed by an operation of the self-scanning apparatus 70 by the customer and it is determined that the customer completes its shopping in such a manner as described above, final settlement of the accounts is performed at the settlement POS terminal of the POS system, and a receipt is issued from the settlement POS terminal.

In this instance, the receipt issued from the settlement POS terminal may have the mark "*" applied thereto so as to indicate that the commodity satisfies a discount sale condition.

In this manner, with the self-scanning POS system of the second embodiment of the present invention, since a customer performs a reading operation for a commodity code of a commodity and the mark "*" is displayed on the display unit 73 when the commodity satisfies a discount sales condition, the customer can discriminate a commodity of an object for discount/price reduction by confirming the mark "*" on the display unit 73 of the self-scanning apparatus 70. Consequently, the customer will not have a suspicion of or inquire a shop person about an indication of a price. Accordingly, the self-scanning POS system of the second embodiment of the present invention is advantageous in that it provides better services to customers.

It is to be noted that, while, in the present embodiment, the mark "*" is displayed, when a predetermined discount sales condition is satisfied, on the display unit 73 of the self-scanning apparatus 70 to notify it, to the customer that the commodity satisfies a discount sales condition, according to the present invention, the method of notification is not limited to the specific method, and some other mark or a message representing such satisfaction may be displayed instead.

Further, the host apparatus 80 in the present embodiment may particularly be a host computer for controlling the entire POS system or the PST server 15 (control apparatus) described hereinabove in connection with the first embodiment.

Figure 22:
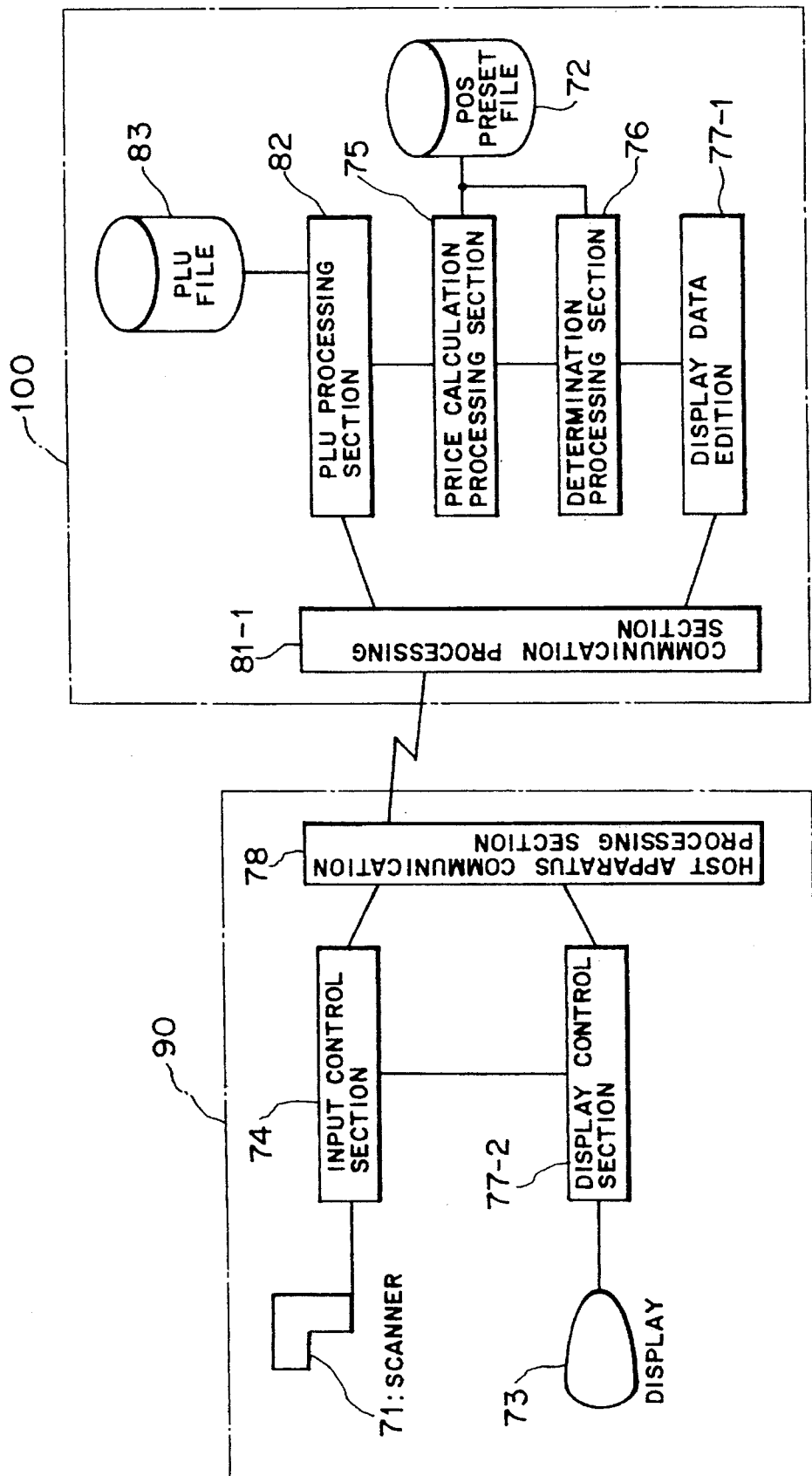
FIG. 22 is a block diagram showing a further self-scanning POS system according to a third preferred embodiment of the present invention.

FIG. 22 shows a self-scanning POS system according to a third preferred embodiment of the present invention. Referring to FIG. 22, the self-scanning POS system shown is a modification to and different from the self-scanning POS system of the second embodiment described above in that the POS preset file 72, the price calculation processing section 75 and the determination processing section 76 are provided not in a self-scanning apparatus 90 but in a host apparatus 100.

The host apparatus 100 includes a display data edition section (display data edition means) 77-1 for editing and producing display data (refer to FIG. 18) to be displayed on the display unit 73, and a communication processing section (display data notification means) 81-1 for communicating with the host apparatus communication processing section 78 of the self-scanning apparatus 70 to notify display data from the display data edition section 77-1 to the self-scanning apparatus 90.

Further, the self-scanning apparatus 90 includes display control means 77-2 for causing the display unit 73 to display thereon display data edited and produced by the display data edition section 77-1.

It is to be noted that the self-scanning apparatus 90 includes a scanner 71, an input control section 74, the display unit 73 and a host apparatus communication processing section 78 which individually have similar functions to those of the second embodiment described above, and also the host apparatus 100 includes a POS preset file 72, a price calculation processing section 75, a determination processing section 76, a PLU processing section 82 and a PLU file 83 individually having similar constructions to those of the second embodiment described above.

Figure 23:
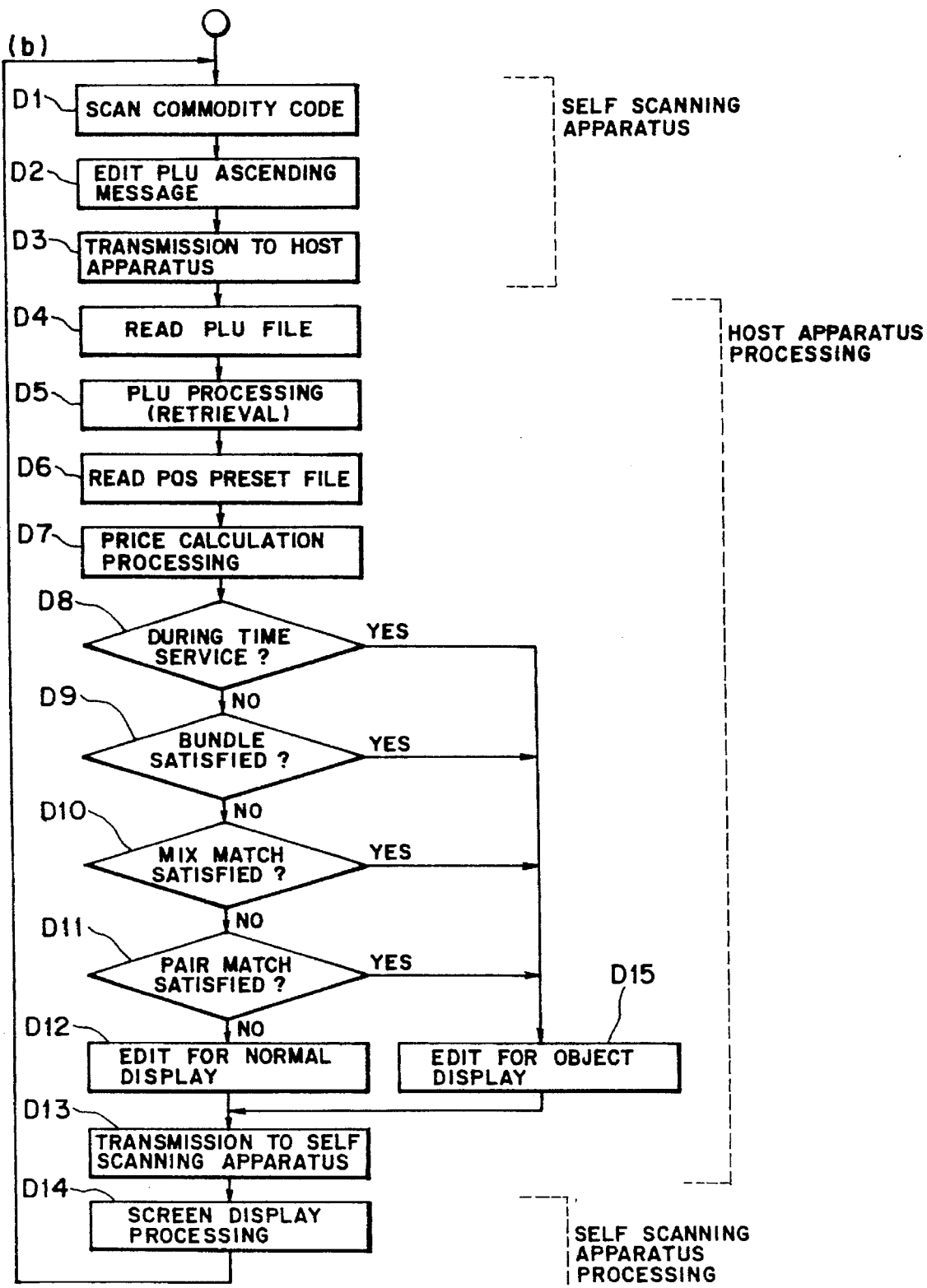
FIG. 23 is a flow chart illustrating operation of the self-scanning POS system shown in FIG. 22.

Operation of the self-scanning POS system of the third embodiment of the present invention having the construction described above will be described below with reference to the flow chart of FIG. 23.

In particular, when a customer manually operates the scanner 71 to effect a reading operation of a commodity code of a commodity to be purchased (step D1), the input control section 74 edits commodity code information as a PLU ascending message (step D2). The commodity code information is transmitted to the host apparatus 100 by the host apparatus communication processing section 78 (step D3).

When the commodity code information is received by the communication processing section 81-1 of the host apparatus 100 and inputted to the PLU processing section 82, the PLU processing section 82 reads in commodity information stored in the PLU file 83 (step D4) and retrieves commodity information corresponding to the commodity code information inputted thereto from the self-scanning apparatus 90 (step D5).

Then, after commodity information corresponding to the commodity code information is retrieved by the PLU processing section 82, the price calculation processing section 75 reads in the sales conditions stored in the POS preset file 72 (step D6) and calculates and determines a sales price of the commodity whose commodity code has been read by means of the scanner 71 based on the sales conditions read in and the commodity information retrieved by the PLU processing section 82 (step D7).

When the commodity whose commodity code has been read in does not satisfy any of the time service condition, the bundle condition, the mix-match condition and the pair match condition (steps D8 to D11), ordinary display data free from the mark "*" are edited and produced by the display data edition section 77-1 (step D12). The display data are transmitted from the communication processing section 81-1 to the self-scanning apparatus 90 (step D13).

When the host apparatus communication processing section 78 of the self-scanning apparatus 90 receives the display data, the display control means 77-2 effects screen displaying processing for the display unit 73 based on the display data (step D14).

On the other hand, when the commodity whose commodity code has been read in satisfies any of the time service condition, the bundle condition, the mix-match condition and the pair match condition (steps D8 to D11), display data (refer to FIG. 18) with the mark "*" applied thereto which indicates that the commodity satisfies a discount sales condition are edited by the display data edition section 77-1. The display data are transmitted from the communication processing section 81-1 to the self-scanning apparatus 90 (step D13).

When the display data are received by the host apparatus communication processing section 78 of the self-scanning apparatus 90, the display control means 77-2 effects screen displaying processing (refer to FIG. 20) for the display unit 73 based on the display data (step D14).

After registration of the commodity to be purchased is performed by the operation of the self-scanning apparatus 90 by the customer in such a manner as described above and it is determined that the shopping of the customer is completed, final settlement of the accounts is performed at a settlement POS terminal of the POS system, and a receipt is issued from the settlement POS terminal.

Also the receipt issued from the settlement POS terminal may have the mark * applied thereto which indicates that the commodity satisfies a discount sales condition.

In this manner, also with the self-scanning POS system of the third embodiment of the present invention, the advantages of the self-scanning POS system of the second embodiment described above can be achieved. Further, in the third embodiment, the self-scanning apparatus 90 is simplified in construction, and the self-scanning apparatus 90 accommodated by a large number in the self-scanning apparatus 90 is made compact and less expensive. Consequently, the system can be built up at a very low cost.

It is to be noted that, while, also in the present embodiment, when a predetermined discount sales condition is satisfied, the mark "*" is displayed on the display unit 73 of the self-scanning apparatus 90 to notify to the customer that the commodity satisfies a discount sales condition, according to the present invention, the displaying manner is not limited to the specific display, but some other mark or a message representing such satisfaction may be displayed.

The present invention is not limited to the specifically described embodiment, and variations and modifications may be made without departing from the scope of the present invention.

What is claimed is:

1. A self-scanning POS system, comprising:
   a POS apparatus including a settlement terminal for effecting final settlement of the accounts for a purchased commodity or commodities;
   one or a plurality of self-scanning registration terminals accommodated in said POS apparatus and each including commodity code reading means for reading a commodity code applied to a commodity; and
   a control apparatus interposed between said POS apparatus and said self-scanning registration terminal or terminals for communicating commodity purchase information based on commodity code information read by said commodity code reading means of said self-scanning registration terminal or any of said self-scanning registration terminals between the self-scanning registration terminal and said POS apparatus.

2. A self-scanning POS system as claimed in claim 1, wherein said self-scanning registration terminal or each of said self-scanning registration terminals includes commodity code information notification means for notifying, when a commodity code is read by said commodity code reading means, the commodity code information to said control apparatus, and said control apparatus includes commodity information retrieval means for retrieving commodity information of the commodity corresponding to the commodity code information notified from said self-scanning registration terminal or any of said self-scanning registration terminals by said commodity code information notification means, and commodity information notification means for notifying the commodity information retrieved by said commodity information retrieval means to the self-scanning registration terminal.

3. A self-scanning POS system as claimed in claim 2, wherein said self-scanning registration terminal or each of said self-scanning registration terminals further includes execution sales price determination means for calculating and determining a sales price of a commodity whose commodity code has been read by said commodity code reading means based on commodity information notified from said control apparatus by said commodity information notification means.

4. A self-scanning POS system as claimed in claim 3, wherein the detailed transaction information is obtained based on commodity information notified from said control apparatus by said commodity information notification means and a sales price determined by said execution sales price determination means.

5. A self-scanning POS system as claimed in claim 4, wherein said self-scanning registration terminal or each of said self-scanning registration terminals further includes display means for displaying thereon commodity information including commodity information notified from said control apparatus by said commodity information notification means and a sales price determined by said execution sales price determination means.

6. A self-scanning POS system as claimed in claim 4, wherein said self-scanning registration terminal or each of said self-scanning registration terminals further includes an end key adapted to be operated upon ending of purchasing of a commodity or commodities, and first terminal identification information notification means for notifying terminal identification information unique to the self-scanning registration terminal to said control apparatus when said end key is operated, and said POS apparatus includes second terminal identification information notification means for notifying, when terminal identification information of said self-scanning registration terminal or any of said self-scanning registration terminals is inputted from said settlement terminal, the terminal identification information to said control apparatus while said control apparatus includes registration terminal control means for holding terminal identification information notified from said self-scanning registration terminal or any of said self-scanning registration terminals by said first terminal identification information notification means to control an operation condition of the self-scanning registration terminal, determination means for determining whether or not the terminal identification information notified from said POS apparatus by said second terminal identification information notification means is held by said registration terminal control means, and detailed transaction information requesting means for requesting, when it is determined by said determination means that the terminal identification information is held by said registration terminal control means, the self-scanning registration terminal corresponding to the terminal identification information to notify the detailed transaction information stored in said storage means.

7. A self-scanning POS system as claimed in claim 6, wherein said self-scanning registration terminal or each of said self-scanning registration terminals further includes detailed transaction information notification means for notifying, when notification of the detailed transaction information is requested from said control apparatus by said detailed transaction information requesting means, the detailed transaction information stored in said storage means to said settlement terminal of said POS apparatus by way of said control apparatus.

8. A self-scanning POS system as claimed in claim 7, wherein said settlement terminal includes inputting means for inputting commodity information to register the commodity information into or modify the detailed transaction information after the detailed transaction information is notified from the self-scanning registration terminal by said detailed transaction information notification means.

9. A self-scanning POS system as claimed in claim 4, wherein said POS apparatus includes terminal identification information notification means for notifying, when terminal identification information of said self-scanning registration terminal or any of said self-scanning registration terminals is inputted from said settlement terminal, the terminal identification information to the self-scanning registration terminal corresponding to the terminal identification information by way of said control apparatus, and said self-scanning registration terminal or each of said self-scanning registration terminals further includes an end key adapted to be operated upon ending of purchasing of a commodity or commodities, condition control means for controlling and holding, when said end key is operated, that the self-scanning registration terminal is in an end condition, determination means for referring to said condition control means to determine whether or not the self-scanning registration terminal is in an end condition at the point of time when terminal identification information is notified from said POS apparatus by said terminal identification information notification means, and detailed transaction information notification means for notifying, when it is determined by said determination means that the self-scanning registration terminal is in an end condition, the detailed transaction information stored in said storage means to said settlement terminal of said POS apparatus by way of said control apparatus.

10. A self-scanning POS system as claimed in claim 3, wherein said self-scanning registration terminal or each of said self-scanning registration terminals further includes display means for displaying thereon commodity information including commodity information notified from said control apparatus by said commodity information notification means and a sales price determined by said execution sales price determination means.

11. A self-scanning POS system as claimed in claim 1, wherein said self-scanning registration terminal or each of said self-scanning registration terminals further includes an end key adapted to be operated upon ending of purchasing of a commodity or commodities, and first terminal identification information notification means for notifying terminal identification information unique to the self-scanning registration terminal to said control apparatus when said end key is operated, and said control apparatus includes registration terminal control means for holding terminal identification information notified from said self-scanning registration terminal or any of said self-scanning registration terminals by said first terminal identification information notification means to control an operation condition of the self-scanning registration terminal.

12. A self-scanning POS system as claimed in claim 1, wherein said self-scanning registration terminal or each of said self-scanning registration terminals includes customer identification information inputting means for inputting customer identification information unique to a customer who uses said self-scanning registration terminal or any of said self-scanning registration terminals, and said POS apparatus includes inquiring means for determining, when customer identification information inputted from said customer identification information inputting means is received by way of said control apparatus, based on the customer identification information whether use of the self-scanning registration terminal is to be permitted or rejected.

13. A self-scanning POS system as claimed in claim 12, wherein said self-scanning registration terminal or each of said self-scanning registration terminals includes control means for disabling use of the self-scanning registration terminal when information received from said inquiring means of said POS apparatus by way of said control apparatus represents that use of the self-scanning registration terminal is to be rejected but enabling use of the self-scanning registration terminal when the information represents that use of the self-scanning registration terminal is to be permitted.

14. A self-scanning POS system as claimed in claim 12, wherein said self-scanning registration terminal or each of said self-scanning registration terminals includes use rejection notification means for notifying, when information received from said inquiring means of said POS apparatus by way of said control apparatus represents that use of the self-scanning registration terminal is to be rejected, such rejection to the customer.

15. A self-scanning POS system as claimed in claim 12, wherein said commodity code reading means serves also as said customer identification information inputting means.

16. A self-scanning POS system as claimed in claim 12, wherein said customer identification information inputting means is constructed as a bar code reader which reads and inputs a membership number in the form of a bar code of a membership card possessed by a customer as the customer identification information.

17. A self-scanning POS system as claimed in claim 12, wherein said customer identification information inputting means is constructed as a magnetic code reader which reads and inputs a membership number in the form of a magnetic code of a membership card possessed by a customer as the customer identification information.

18. A self-scanning POS system as claimed in claim 12, wherein said POS apparatus further includes a customer data base for storing commodity purchase information of individual customers for individual customer identification information, and registration means for registering, when a customer uses said self-scanning registration terminal or any of said self-scanning registration terminals, commodity purchase information transmitted thereto from the self-scanning registration terminal by way of said control apparatus into said customer data base in accordance with the customer identification information unique to the customer.

19. A self-scanning registration terminal, comprising:

commodity code reading means for reading a commodity code applied to a commodity; and said self-scanning registration terminal being accommodated by way of a control apparatus in a POS apparatus which includes a settlement terminal for effecting final settlement of the accounts for a purchased commodity or commodities;

said self-scanning registration terminal communicating commodity purchase information based on commodity code information read by said commodity code reading means with said POS apparatus by way of said control apparatus and wherein detailed transaction information is communicated to the settlement terminal by said control apparatus.

20. A self-scanning registration terminal as claimed in claim 19, further comprising commodity code information notification means for notifying, when a commodity code is read by said commodity code reading means, the commodity code information to said control apparatus.

21. A self-scanning registration terminal as claimed in claim 20, further comprising execution sales price determination means for calculating and determining a sales price of a commodity whose commodity code has been read by said commodity code reading means based on commodity information of the commodity corresponding to the commodity code information notified from said control apparatus in response to the commodity code information notified to said control apparatus by said commodity code information notification means.

22. A self-scanning registration terminal as claimed in claim 21, wherein the detailed transaction information is obtained based on commodity information notified from said control apparatus and a sales price determined by said execution sales price determination means.

23. A self-scanning registration terminal as claimed in claim 22, further comprising display means for displaying thereon commodity information including commodity information notified from said control apparatus and a sales price determined by said execution sales price determination means.

24. A self-scanning registration terminal as claimed in claim 22, further comprising detailed transaction information notification means for notifying, when notification of the detailed transaction information is requested from said control apparatus, the detailed transaction information stored in said storage means to said settlement terminal of said POS apparatus by way of said control apparatus.

25. A self-scanning registration terminal as claimed in claim 21, further comprising display means for displaying thereon commodity information including commodity information notified from said control apparatus and a sales price determined by said execution sales price determination means.

26. A self-scanning registration terminal as claimed in claim 19, further comprising an end key adapted to be operated upon ending of purchasing of a commodity or commodities, and terminal identification information notification means for notifying, when said end key is operated, terminal identification information unique to said self-scanning registration terminal to said control apparatus.

27. A control apparatus for a self-scanning registration terminal interposed between a POS apparatus including a settlement terminal for effecting final settlement of the accounts for a purchased commodity or commodities and one or a plurality of self-scanning registration terminals each including commodity code reading means for reading a commodity code applied to a commodity such that said self-scanning registration terminal or terminals are accommodated in said POS apparatus by way of said control apparatus, wherein said control apparatus communicates commodity purchase information based on commodity code information read by said commodity code reading means of said self-scanning registration terminal or any of said self-scanning registration terminals between the self-scanning registration terminal and said POS apparatus, and wherein detailed transaction information is communicated to said settlement terminal.

28. A control apparatus for a self-scanning registration terminal as claimed in claim 27, comprising:

commodity information retrieval means for retrieving commodity information of a commodity corresponding to commodity code information read by said commodity code reading means and notified from the self-scanning registration terminal; and commodity information notification means for notifying the commodity information retrieved by said commodity information retrieval means to the self-scanning registration terminal.

29. A control apparatus for a self-scanning registration terminal as claimed in claim 28, further comprising registration terminal control means for holding terminal identification information notified from said self-scanning registration terminal or any of said self-scanning registration terminals to control an operation condition of the self-scanning registration terminal.

30. A control apparatus for a self-scanning registration terminal as claimed in claim 29, further comprising determination means for determining whether or not terminal identification information notified from said settlement terminal of said POS apparatus is held by said registration terminal control means, and detailed transaction information requesting means for requesting, when it is determined by said determination means that the terminal identification information is held by said registration terminal control means, notification of the detailed transaction information to the self-scanning registration terminal corresponding to the terminal identification information.

31. A control apparatus for a self-scanning registration terminal as claimed in claim 27, further comprising registration terminal control means for holding terminal identification information notified from said self-scanning registration terminal or any of said self-scanning registration terminals to control an operation condition of the self-scanning registration terminal.

32. A control apparatus for a self-scanning registration terminal as claimed in claim 31, further comprising determination means for determining whether or not terminal identification information notified from said settlement terminal of said POS apparatus is held by said registration terminal control means, and detailed transaction information requesting means for requesting, when it is determined by said determination means that the terminal identification information is held by said registration terminal control means, notification of detailed transaction information to the self-scanning registration terminal corresponding to the terminal identification information.

33. A POS apparatus for a self-scanning registration terminal, comprising:
   a settlement terminal for effecting final settlement of the accounts for a purchased commodity or commodities;
   said POS apparatus accommodating by way of a control apparatus one or a plurality of self-scanning registration terminals each including commodity code reading means for reading a commodity code applied to a commodity;
   said POS apparatus communicating commodity purchase information based on commodity code information read by said commodity code reading means with the self-scanning registration terminal by way of said control apparatus, and said control apparatus controlling the communication to said terminal of detailed transaction information.

34. A POS apparatus for a self-scanning registration terminal as claimed in claim 33, further comprising terminal identification information notification means for notifying terminal identification information of said self-scanning registration terminal or any of said self-scanning registration terminals inputted from said settlement terminal to the self-scanning registration terminal or said control apparatus.

35. A POS apparatus for a self-scanning registration terminal as claimed in claim 33, further comprising inquiring means for determining, when customer identification information is received from said self-scanning registration terminal or any of said self-scanning registration terminals by way of said control apparatus, based on the customer identification information whether use of the self-scanning registration terminal is to be permitted or rejected.

36. A serf-scanning POS system comprising:
   a self-scanning registration terminal including commodity code reading means for reading a commodity code applied to a commodity; and
   a control apparatus for controlling said self-scanning registration terminal;
   said self-scanning registration terminal including commodity code information notification means for notifying, when a commodity code is read by said commodity code reading means, the commodity code information to said control apparatus, and display means for displaying thereon commodity information regarding the commodity whose commodity code has been read by said commodity code reading means;
   said control apparatus including a commodity information file for storing commodity information of commodities corresponding to commodity codes, and commodity information retrieval means for retrieving from said commodity information file commodity information corresponding to commodity code information notified from said self-scanning registration terminal by said commodity code information notification means;
   said commodity information file having stored in advance therein display contents to be automatically displayed on said display means of said self-scanning registration terminal when a predetermined discount sales condition is satisfied as commodity information of a commodity corresponding to a commodity code,
   wherein said control apparatus further includes commodity code information notification means for notifying commodity information retrieved by said commodity information retrieval means to said self-scanning registration terminal, and said self-scanning registration terminal further includes a preset file in which various sales conditions including the predetermined discount sales condition are stored in advance for individual commodities, discount sale condition determination means for reading out, in accordance with commodity information notified from said control apparatus by said commodity code information notification means, the predetermined discount sales condition of the commodity stored in said preset file and determining whether or not the predetermined discount sales condition is satisfied, execution sales price determination means for reading out, in accordance with the commodity information notified from said control apparatus by said commodity code information notification means, the sales conditions of the commodity stored in said preset file and calculating and determining a sales price of the commodity whose commodity code has been read by said commodity code reading means based on the thus read out sales conditions and the commodity information notified from said control apparatus by said commodity code information notification means, and display control means for editing and producing, when it is determined by said discount sales condition determination means that the predetermined discount sales condition is satisfied, display data for said display means based on the display contents notified as the commodity information from said control apparatus by said commodity code information notification means, the other commodity information and the sales price determined by said execution sales price determination means and controlling said display means to display the display data thereon.

37. A self-scanning POS system comprising:
   a self-scanning registration terminal including commodity code reading means for reading a commodity code applied to a commodity; and
   a control apparatus for controlling said self-scanning registration terminal;
   said self-scanning registration terminal including commodity code information notification means for notifying, when a commodity code is read by said commodity code reading means, the commodity code information to said control apparatus, and display means for displaying thereon commodity information regarding the commodity whose commodity code has been read by said commodity code reading means;
   said control apparatus including a commodity information file for storing commodity information of commodities corresponding to commodity codes, and commodity information retrieval means for retrieving from said commodity information file commodity information corresponding to commodity code information notified from said self-scanning registration terminal by said commodity code information notification means;

said commodity information file having stored in advance therein display contents to be automatically displayed on said display means of said self-scanning registration terminal when a predetermined discount sales condition is satisfied as commodity information of a commodity corresponding to a commodity code, wherein said control apparatus further includes a preset file in which various sales conditions including the predetermined discount sales condition are stored in advance for individual commodities, discount sales condition determination means for reading out, based on commodity information retrieved by said commodity information retrieval means, the predetermined discount sales condition of the commodity stored in said preset file and determining whether or not the predetermined sales condition is satisfied, execution sales price determination means for reading out, in accordance with the commodity information retrieved by said commodity information retrieval means, the sales conditions of the commodity stored in said preset file and calculating and determining a sales price of the commodity whose commodity code has been read by said commodity code reading means based on the thus read out sales conditions and the commodity information retrieved by said commodity information retrieval means, display data edition means for editing and producing, when it is determined by said discount sales condition determination means that the predetermined discount sales condition is satisfied, display data for said display means of said self-scanning registration terminal based on the display contents retrieved as the commodity information by said commodity information retrieval means, the other commodity information and the sales price determined by said execution sales price determination means, and display data notification means for notifying the display data edited and produced by said display data edition means to said self-scanning registration terminal, and said self-scanning registration terminal further includes control means for controlling said display means to display thereon the display data notified from said control apparatus by said display data notification means.

* * * * *